(12) United States Patent
Yamamoto et al.

(10) Patent No.: US 9,896,152 B2
(45) Date of Patent: Feb. 20, 2018

(54) BICYCLE TRANSMISSION SYSTEM

(71) Applicant: SHIMANO INC., Sakai (JP)

(72) Inventors: Tomohisa Yamamoto, Sakai (JP); Satoshi Shahana, Sakai (JP); Makoto Usui, Sakai (JP)

(73) Assignee: SHIMANO INC., Sakai (JP)

( * ) Notice: Subject to any disclaimer, the term of this patent is extended or adjusted under 35 U.S.C. 154(b) by 359 days.

(21) Appl. No.: 14/720,944

(22) Filed: May 25, 2015

(65) Prior Publication Data
US 2016/0347411 A1    Dec. 1, 2016

(51) Int. Cl.
| | | |
|---|---|---|
| *B62M 6/45* | (2010.01) | |
| *B62M 6/55* | (2010.01) | |
| *B62M 9/122* | (2010.01) | |
| *B62M 9/132* | (2010.01) | |
| *B62M 25/08* | (2006.01) | |
| *B62M 25/00* | (2006.01) | |

(52) U.S. Cl.
CPC .............. *B62M 6/45* (2013.01); *B62M 6/55* (2013.01); *B62M 9/122* (2013.01); *B62M 9/132* (2013.01); *B62M 25/08* (2013.01); *B62M 2025/003* (2013.01)

(58) Field of Classification Search
CPC .......... B62M 6/45; B62M 6/55; B62M 9/122; B62M 25/08; B62M 2025/003
See application file for complete search history.

(56) References Cited

U.S. PATENT DOCUMENTS

2013/0311019 A1*  11/2013  Tanaka ................ B62M 6/45
                                                    701/22

FOREIGN PATENT DOCUMENTS

| JP | 3190491 | 2/1995 |
|---|---|---|
| JP | 11-245876 | 9/1999 |
| JP | 11-278360 | 10/1999 |
| JP | 2000-118481 | 4/2000 |

* cited by examiner

*Primary Examiner* — Huan Le
(74) *Attorney, Agent, or Firm* — Mori & Ward, LLP

(57) ABSTRACT

A bicycle transmission system comprises a first input device, a transmission, an assist device, and a controller. The first input device is configured to receive a first input operation from a user. The transmission is configured to transmit a pedaling torque to a wheel at a current gear ratio among a plurality of gear ratios. The assist device is configured to assist a rotation of the wheel at a current assist ratio among a plurality of assist ratios. The controller is configured to change the current gear ratio into a predetermined gear ratio without changing the current assist ratio based on the first input operation in a first condition. The controller is configured to change the current gear ratio into a predetermined gear ratio and change the current assist ratio into a predetermined assist ratio based on the first input operation in a second condition.

23 Claims, 22 Drawing Sheets

|     |      | FS    |       |
| --- | ---  | ---   | ---   |
|     |      | 39    | 53    |
|     |      | LOW   | TOP   |
| RS | 28 | 1st | 1.39 (Gr601) | 1.89 |
|    | 25 | 2nd | 1.56 (Gr602) | 2.12 |
|    | 23 | 3rd | 1.70 (Gr603) | 2.30 |
|    | 21 | 4th | 1.86 (Gr604) | 2.52 |
|    | 19 | 5th | 2.05 (Gr605) | 2.79 |
|    | 17 | 6th | 2.29 (Gr606) | 3.12 (Gr608) |
|    | 15 | 7th | 2.60 (Gr607) | 3.53 (Gr609) |
|    | 14 | 8th | 2.79 | 3.79 (Gr610) |
|    | 13 | 9th | 3.00 | 4.08 (Gr611) |
|    | 12 | 10th | 3.25 | 4.42 (Gr612) |
|    | 11 | 11th | 3.55 | 4.82 (Gr613) |

BICYCLE TRANSMISSION SYSTEM

BACKGROUND OF THE INVENTION

Field of the Invention

The present invention relates to a bicycle transmission system.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. For example, a power-assisted bicycle has been known that includes an assist component.

SUMMARY OF THE INVENTION

In accordance with a first aspect of the present invention, a bicycle transmission system comprises a first input device, a transmission, an assist device, and a controller. The first input device is configured to receive a first input operation from a user. The transmission has a plurality of gear ratios. The transmission is configured to transmit a pedaling torque to a wheel at a current gear ratio among the plurality of gear ratios. The assist device has a plurality of assist ratios. The assist device is configured to assist a rotation of the wheel at a current assist ratio among the plurality of assist ratios. The controller is configured to change the current gear ratio into a predetermined gear ratio without changing the current assist ratio based on the first input operation in a first condition. The controller is configured to change the current gear ratio into a predetermined gear ratio and change the current assist ratio into a predetermined assist ratio based on the first input operation in a second condition. The second condition is different from the first condition.

In accordance with a second aspect of the present invention, the bicycle transmission system according to the first aspect is configured so that the controller is configured to change the current assist ratio into a predetermined assist ratio without changing the current gear ratio based on the first input operation in a third condition. The third condition is different from the first condition and the second condition.

In accordance with a third aspect of the present invention, the bicycle transmission system according to the first aspect is configured so that the controller is configured to set a first predetermined gear ratio as the current gear ratio based on the first input operation in the first condition to change the current gear ratio into the first predetermined gear ratio. The controller is configured to set a second predetermined gear ratio as the current gear ratio and set a first predetermined assist ratio as the current assist ratio based on the first input operation in the second condition to respectively change the current gear ratio and the current assist ratio into the second predetermined gear ratio and the first predetermined assist ratio. The controller is configured to control the transmission and the assist device based on the current gear ratio and the current assist ratio that are newly set.

In accordance with a fourth aspect of the present invention, the bicycle transmission system according to the first aspect is configured so that the controller has control data. The controller is configured to change the current gear ratio into a predetermined gear ratio based on the first input operation and the control data in the first condition. The controller is configured to change the current gear ratio into a predetermined gear ratio and change the current assist ratio into a predetermined assist ratio based on the first input operation and the control data in the second condition.

In accordance with a fifth aspect of the present invention, the bicycle transmission system according to the fourth aspect is configured so that the control data comprises combination information that represents predetermined combinations of the plurality of gear ratios and the plurality of assist ratios.

In accordance with a sixth aspect of the present invention, the bicycle transmission system according to the fifth aspect is configured so that the control data comprises order information that represents an order of control by the controller concerning the combination information.

In accordance with a seventh aspect of the present invention, the bicycle transmission system according to the sixth aspect further comprises a setting device via which the user is to change the order information.

In accordance with an eighth aspect of the present invention, the bicycle transmission system according to the first aspect is configured so that the first input device is configured to receive an upshifting operation as the first input operation. The first input device is configured to receive a downshifting operation as the first input operation. The controller is configured to change the current gear ratio into a predetermined gear ratio without changing the current assist ratio based on one of the upshifting operation and the downshifting operation in the first condition. The controller is configured to change the current gear ratio into a predetermined gear ratio and change the current assist ratio into a predetermined assist ratio based on one of the upshifting operation and the downshifting operation in the second condition.

In accordance with a ninth aspect of the present invention, the bicycle transmission system according to the eighth aspect is configured so that the controller has control data. The controller is configured to change the current gear ratio into a predetermined gear ratio without changing the current assist ratio based on the control data and one of the upshifting operation and the downshifting operation in the first condition. The controller is configured to change the current gear ratio into a predetermined gear ratio and change the current assist ratio into a predetermined assist ratio based on the control data and one of the upshifting operation and the downshifting operation in the second condition.

In accordance with a tenth aspect of the present invention, the bicycle transmission system according to the ninth aspect is configured so that the control data comprises combination information that represents predetermined combinations of the plurality of gear ratios and the plurality of assist ratios. The predetermined combinations selectable based on the upshifting operation are equal to the predetermined combinations selectable based on the downshifting operation.

In accordance with an eleventh aspect of the present invention, the bicycle transmission system according to the ninth aspect is configured so that the control data comprises combination information that represents predetermined combinations of the plurality of gear ratios and the plurality of assist ratios. The predetermined combinations selectable based on the upshifting operation are at least partly different from the predetermined combinations selectable based on the downshifting operation.

In accordance with a twelfth aspect of the present invention, the bicycle transmission system according to the first aspect is configured so that the first condition comprises a condition that the current gear ratio is between a first gear ratio of the plurality of gear ratios and a second gear ratio of the plurality of gear ratios. The first gear ratio is smaller than a maximum gear ratio of the plurality of gear ratios. The second gear ratio is larger than a minimum gear ratio of the plurality of gear ratios.

In accordance with a thirteenth aspect of the present invention, the bicycle transmission system according to the first aspect further comprises a second input device and a mode selector. The second input device is configured to receive a second input operation from the user. Via the mode selector, the user is to select one of a first mode and a second mode. The controller controls the transmission and the assist device based on the first input operation in the first mode regardless of the second input operation. The controller controls the transmission based on the first input operation in the second mode regardless of the second input operation. The controller controls the assist device based on the second input operation in the second mode regardless of the first input operation.

In accordance with a fourteenth aspect of the present invention, a bicycle transmission system comprises a first input device, a transmission, an assist device, and a controller. The first input device is configured to receive a first input operation from a user. The transmission has a plurality of gear ratios. The transmission is configured to transmit a pedaling torque to a wheel at a current gear ratio among the plurality of gear ratios. The assist device has a plurality of assist ratios. The assist is configured to assist a rotation of the wheel at a current assist ratio among the plurality of assist ratios. The controller is configured to change the current gear ratio into a predetermined gear ratio without changing the current assist ratio based on the first input operation in a first condition. The controller is configured to change the current assist ratio into a predetermined assist ratio without changing the current gear ratio based on the first input operation in a third condition different from the first condition.

In accordance with a fifteenth aspect of the present invention, a bicycle transmission system comprises a first electrical input part, a transmission, an assist device, and a controller. The first electrical input part is configured to receive a first operation from a user. The transmission has a plurality of gear ratios. The transmission is configured to transmit a pedaling torque to a wheel at a current gear ratio among the plurality of gear ratios. The assist device has a plurality of assist ratios. The assist is configured to assist a rotation of the wheel at a current assist ratio among the plurality of assist ratios. The controller is operatively connected to the first electrical input part. The controller is configured to change the current gear ratio based on the first operation in a first condition. The controller is configured to change the current assist ratio based on the first operation in a second condition different from the first condition.

In accordance with a sixteenth aspect of the present invention, the bicycle transmission system according to the fifteenth aspect is configured so that the controller is configured to change the current gear ratio and the current assist ratio based on the first operation in the second condition.

In accordance with a seventeenth aspect of the present invention, the bicycle transmission system according to the fifteenth aspect is configured so that the controller is configured to change the current gear ratio without changing the current assist ratio based on the first operation in the first condition.

In accordance with an eighteenth aspect of the present invention, the bicycle transmission system according to the fifteenth aspect further comprises a second electrical input part configured to receive a second operation from the user. The controller is operatively connected to the second electrical input part. The controller is configured to change the current gear ratio based on the second operation in a fourth condition. The controller is configured to change the current assist ratio based on the second operation in a fifth condition.

In accordance with a nineteenth aspect of the present invention, the bicycle transmission system according to the eighteenth aspect is configured so that the controller is configured to change the current gear ratio and the current assist ratio based on the second operation in the fifth condition.

In accordance with a twentieth aspect of the present invention, the bicycle transmission system according to the eighteenth aspect is configured so that the controller is configured to change the current gear ratio without changing the current assist ratio based on the second operation in the fourth condition.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 21 shows a shift table and a transmission route of the bicycle transmission system in accordance with the sixth embodiment.

DESCRIPTION OF THE EMBODIMENTS

Figure 1:
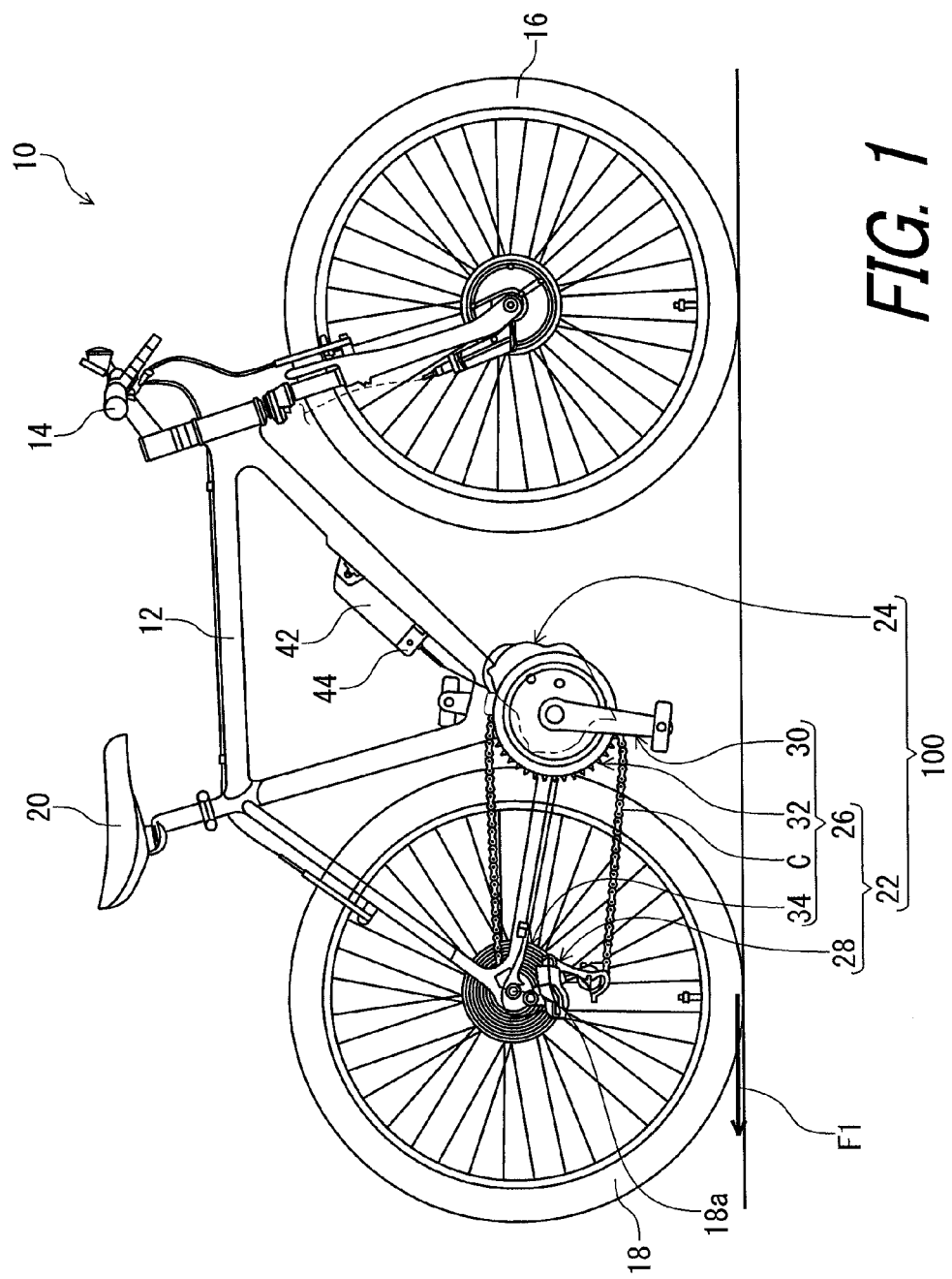
FIG. 1 is a side elevational view of a bicycle equipped with a bicycle transmission system in accordance with a first embodiment.

The embodiments will now be described with reference to the accompanying drawings, wherein like reference numerals designate corresponding or identical elements throughout the various drawings.

First Embodiment

FIG. 1 is a side elevational view of a bicycle 10 equipped with a bicycle transmission system 100 in accordance with this embodiment. The bicycle 10 is a power-assisted bicycle. While the bicycle 10 is illustrated as a mountain bike, the bicycle transmission system 100 can be applied to any type of power-assisted bicycle.

As seen in FIG. 1, the bicycle 10 includes a bicycle frame 12, a handlebar 14, a front wheel 16, a rear wheel 18, and a saddle 20. The rear wheel 18 can also be referred to as a wheel 18. The handlebar 14 is mounted on the bicycle frame 12. The front wheel 16 is rotatably attached to the bicycle frame 12. The rear wheel 18 is rotatably attached to the bicycle frame 12.

In the present application, the directional terms "front", "rear", "forward", "rearward", "left", "right", "transverse", "upward" and "downward" as well as any other similar directional terms refer to those directions which are determined on the basis of a user (e.g., a rider) who sits on the saddle 20 of the bicycle 10 with facing the handlebar 14. Accordingly, these terms, as utilized to describe bicycle components, should be interpreted relative to the bicycle 10 equipped with the bicycle components as used in an upright riding position on a horizontal surface.

The bicycle transmission system 100 comprises a transmission 22 and an assist device 24. The transmission 22 includes a drive train 26 and a rear derailleur 28. The drive train 26 includes a bicycle chain C, a crank assembly 30, a front sprocket 32, and a rear sprocket 34. The front sprocket 32 is mounted to the crank assembly 30. The rear sprocket 34 is mounted to a hub assembly 18a of the rear wheel 18. The bicycle chain C is provided between the front sprocket 32 and the rear sprocket 34 with being engaged with the front sprocket 32 and the rear sprocket 34. The rear derailleur 28 is configured to shift the bicycle chain C relative to the rear sprocket assembly 34. While the transmission 22 includes the drive train 26 and the rear derailleur 28 in the illustrated embodiment, other transmissions such as an internal gear hub, a gear box and a continuously variable transmission can be applied to the bicycle transmission system 100 as the transmission 22.

Pedaling torque applied to the crank assembly 30 is transmitted to the rear wheel 18 through the front sprocket 32, the bicycle chain C, and the rear sprocket 34. The assist device 24 is configured to assist the rotation of the wheel 18. In the illustrated embodiment, the assist device 24 is configured to assist the rotation of the wheel 18 via the crank assembly 30.

Figure 2:
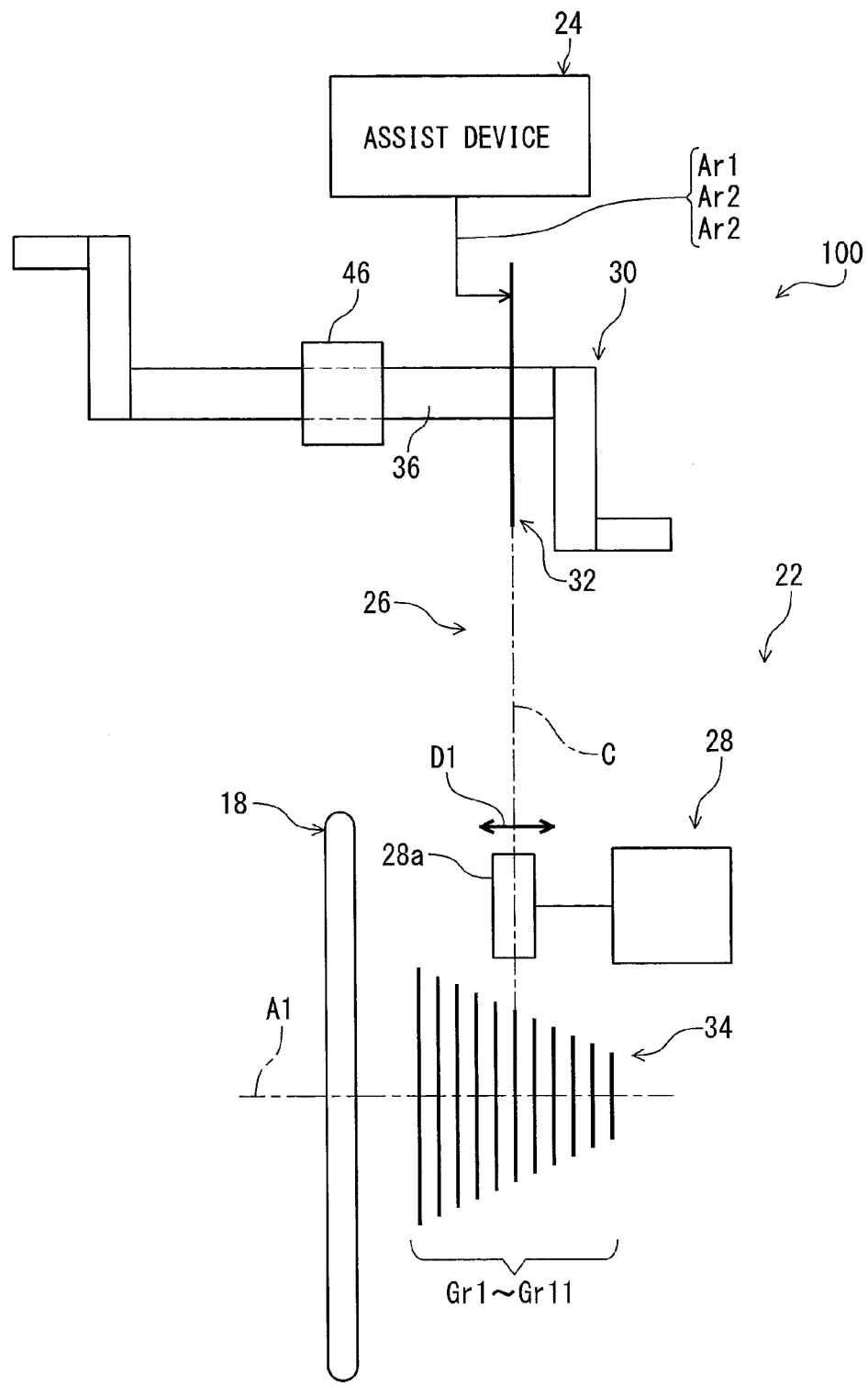
FIG. 2 is a schematic view of the bicycle transmission system in accordance with the first embodiment.

FIG. 2 is a schematic view of the bicycle transmission system 100.

The assist device 24 has a plurality of assist ratios. The assist device 24 is configured to assist the rotation of the wheel 18 at a current assist ratio among the plurality of assist ratios. In the illustrated embodiment, the assist device 24 has a plurality of assist ratios Ar1, Ar2, and Ar3. The assist device 24 is configured to assist the rotation of the wheel 18 at the current assist ratio among the plurality of assist ratios Ar1, Ar2, and Ar3. The crank assembly 30 includes a crank shaft 36 rotatable relative to the bicycle frame 12 (FIG. 1). The front sprocket 32 is mounted to the crank shaft 36 to be integrally rotatable with the crank shaft 36.

The assist device 24 is coupled to the front sprocket 32 via reduction gears (not shown). The assist device 24 is configured to generate an assisting torque to assist the rotation of the wheel 18 at the current assist ratio among the plurality of assist ratios Ar1, Ar2, and Ar3. The assisting torque is transmitted from the assist device 24 to the front sprocket 32 via the reduction gears (not shown). The assist ratio is a ratio of the assisting torque to the pedaling torque. While the assisting torque is transmitted to the front sprocket 32, the assist device 24 can be configured to input the assisting torque to the wheel 18 without via the drive train 26 if needed and/or desired. Furthermore, while the assist device 24 assists the rotation of the rear wheel 18 in the illustrated embodiment, the assist device 24 can be configured to assist the front wheel 16 or rear wheel 18 directly if needed and/or desired.

The transmission 22 has a plurality of gear ratios. The transmission 22 is configured to transmit the pedaling torque to the wheel 18 at a current gear ratio among the plurality of gear ratios. In the illustrated embodiment, the transmission 22 has a plurality of gear ratios Gr1 to Gr11. The transmission 22 is configured to transmit the pedaling torque to the wheel 18 at a current gear ratio among the plurality of gear ratios Gr1 to Gr11. Specifically, the rear sprocket 34 has a plurality of rear sprocket elements. In the illustrated embodiment, the rear sprocket 34 includes eleven rear sprocket elements. The rear derailleur 28 includes a chain guide 28a to guide the bicycle chain C between the rear sprocket elements in an axial direction D1 of a rotational axis A1 of the rear wheel 18 to change a speed stage among a plurality of speed stages. The gear ratio is a ratio of a total number of teeth of one of the rear sprocket elements to a total number of teeth of the front sprocket 32. The gear ratio can also be a ratio of a rotational speed of the crank assembly 30 to a rotational speed of the rear sprocket 34 (or the rear wheel 18).

Figure 3:
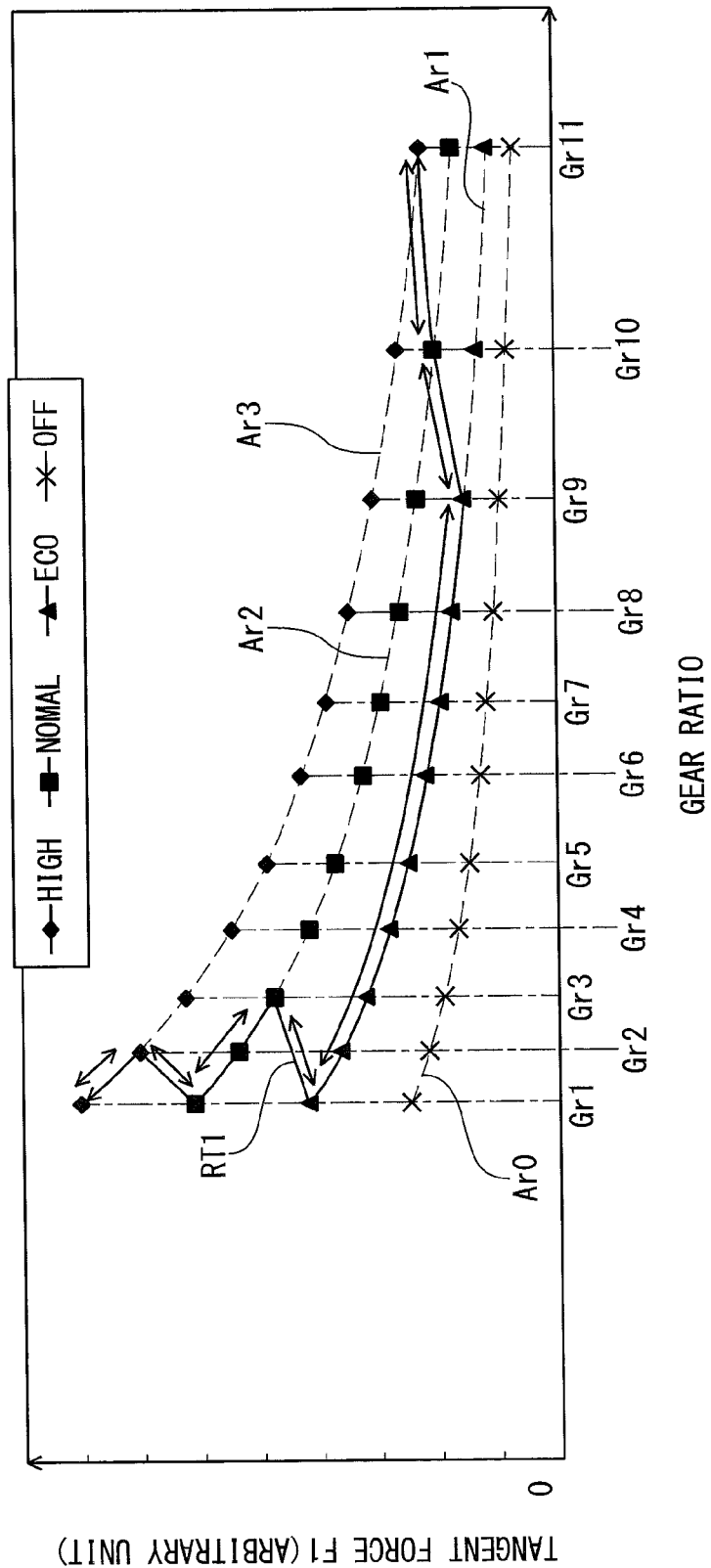
FIG. 3 is a diagram showing a relation between a tangent force of a wheel, gear ratios, and assist ratios in the bicycle illustrated in FIG. 1.

FIG. 3 is a diagram showing a relation between a tangent force F1 (FIG. 1) of the rear wheel 18, the gear ratios, and the assist ratios in a case where the pedaling torque and a cadence of the crank assembly 30 are constant. As seen in FIG. 1, the tangent force F1 is applied from the rear wheel 18 to the ground in a tangent direction of the rear wheel 18.

As seen in FIG. 3, the gear ratio Gr1 corresponds to low gear and is lowest in the gear ratios Gr1 to Gr11. The gear ratio Gr11 corresponds to top gear and is highest in the gear ratios Gr1 to Gr11. The assist ratios Ar1, Ar2, and Ar3 respectively correspond to an Eco-mode, a Normal-mode, and a High-mode. The assist ratio Ar3 is larger than the assist ratio Ar2. The assist ratio Ar2 is larger than the assist ratio Ar1. An assist ratio Ar0 corresponds to a state where the assist device 24 is OFF.

Figure 4:
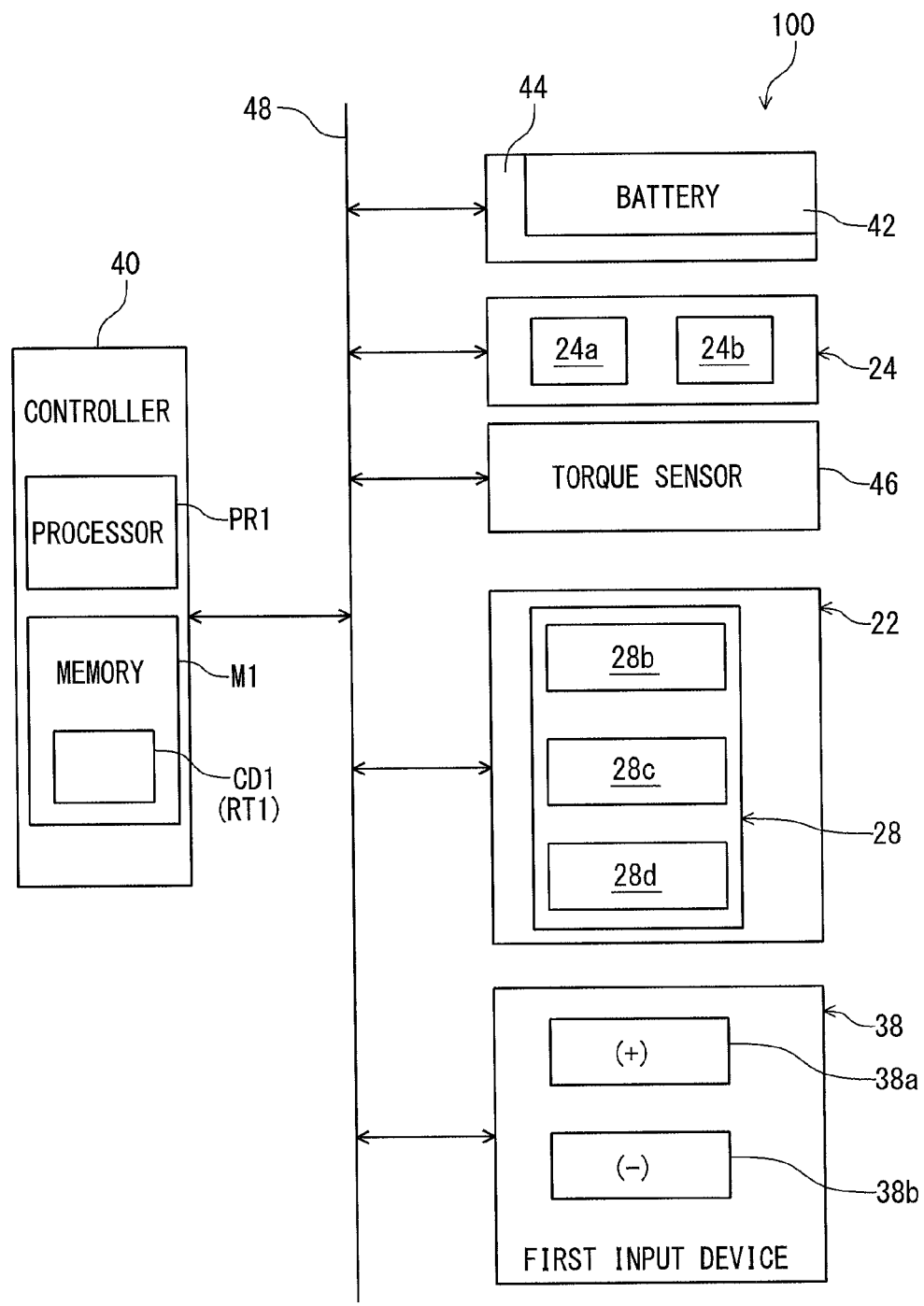
FIG. 4 is a block diagram illustrating a configuration of the bicycle transmission system in accordance with the first embodiment.

FIG. 4 is a block diagram illustrating the configuration of the bicycle transmission system 100 in accordance with this embodiment.

As seen in FIG. 4, the bicycle transmission system 100 comprises a first input device 38 and a controller 40. The first input device 38 is configured to receive a first input operation from the user. The controller 40 is configured to change at least one of the current gear ratio and the current assist ratio based on the first input operation.

Figure 5:
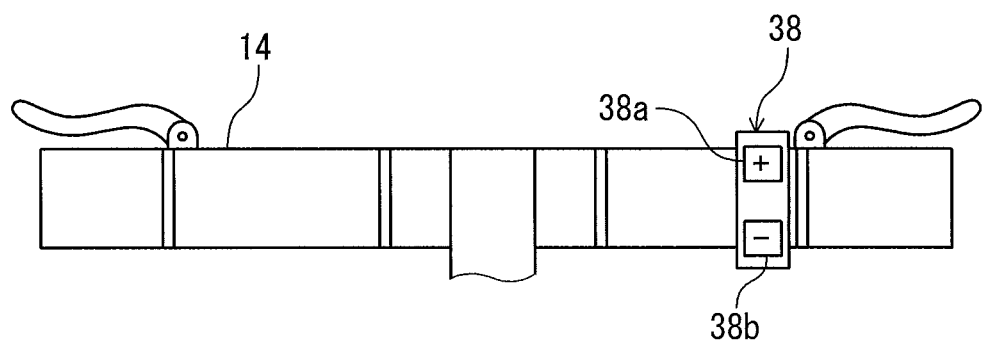
FIG. 5 is an enlarged plan view of a handlebar of the bicycle illustrated in FIG. 1.

FIG. 5 is an enlarged plan view of the handlebar 14.

As seen in FIG. 5, the first input device 38 is mounted on the handlebar 14. As seen in FIGS. 4 and 5, the first input device 38 has a first electrical input part 38a and a second electrical input part 38b. Namely, the bicycle transmission system 100 comprises the first electrical input part 38a and the second electrical input part 38b. For example, each of the first electrical input part 38a and the second electrical input part 38b includes an electrical switch. The first input operation comprises a first operation and a second operation.

As seen in FIG. 4, the first electrical input part 38a is configured to receive the first operation from the user. The controller 40 is operatively connected to the first electrical input part 38a. The second electrical input part 38b is configured to receive the second operation from the user. The controller 40 is operatively connected to the second electrical input part 38b. In the illustrated embodiment, the first input device 38 is configured to receive the upshifting operation as the first input operation and is configured to receive the downshifting operation as the first input operation. The first electrical input part 38a substantially corresponds to an upshifting operating part configured to receive the upshifting operation from the user. The second electrical input part 38b substantially corresponds to a downshifting operating part configured to receive the downshifting operation from the user.

When the first input device 38 receives the first input operation, the first input device 38 generates a command signal corresponding to the first input operation and outputs the command signal to the controller 40. Specifically, when the first electrical input part 38a receives the first operation, the first electrical input part 38a generates a first command signal corresponding to the first operation and outputs the first command signal to the controller 40. When the second electrical input part 38b receives the second operation, the second electrical input part 38b generates a second command signal corresponding to the second operation and outputs the second command signal to the controller 40. The controller 40 controls the assist device 24 and the transmission 22 based on a command signal (i.e., the first input operation).

As seen in FIG. 4, the bicycle transmission system 100 further comprises a battery 42, a battery holder 44, and a torque sensor 46. The battery 42 is mounted to a battery holder 44 secured to the bicycle frame 12 (FIG. 1). The battery 42 is configured to supply electric power to the transmission 22, the assist device 24, the first input device 38, the controller 40, and the torque sensor 46. The battery 42 includes a rechargeable battery such as a lithium-ion battery. The battery 42 is attachable to and detachable from the battery holder 44.

The transmission 22, the assist device 24, the first input device 38, the controller 40, the battery 42, and the torque sensor 46 are connected mutually via a power line communication (PLC) network 48. The electric power is supplied from the battery 42 to the assist device 24, the transmission 22, the first input device 38, the controller 40, and the torque sensor 46 through the PLC network 48. Electric signals are transmitted between the assist device 24, the transmission 22, the first input device 38, the controller 40, and the torque sensor 46 through the PLC network 48. The assist device 24 generates assisting torque to rotate the crank assembly 30 using electric power supplied from the battery 42. The first input device 38 can be connected to the controller 40 through wireless communication network if needed and/or desired.

As seen in FIG. 4, the assist device 24 includes an inverter 24a and an assist motor 24b. The inverter 24a is configured to convert direct-current (DC) power supplied from the battery 42 to alternating-current (AC) power. The assist motor 24b is configured to generate the assisting torque using the AC power.

As seen in FIG. 2, the torque sensor 46 is mounted on the bicycle frame 12 (FIG. 1). The torque sensor 46 is configured to sense the pedaling torque applied to the crank assembly 30 (specifically, the crank shaft 36). Examples of the torque sensor 46 include a magnetostrictive sensor or a strain sensor.

As seen in FIG. 4, the controller 40 is configured to control the assist device 24 to change the assist torque based on the current assist ratio and the pedaling torque sensed by the torque sensor 46. For example, the controller 40 can be mounted in one of the transmission 22, the assist device 24, and the battery holder 44. The controller 40 is constituted as a microcomputer and includes a processor PR1 and a memory M1. The processor PR1 includes a central processing unit (CPU). The memory M1 includes a read only memory (ROM) and a random access memory (RAM). For example, a program stored in the memory M1 is read into the processor PR1, and thereby functions of the controller 40 are performed. The controller 40 generates an assist command signal indicating the assist ratio based on the command signal (i.e., the first input operation) outputted from the first input device 38. The controller 40 stores the current assist ratio and the pedaling torque sensed by the torque sensor 46 in the memory M1. The control of the controller 40 will be described in detail later.

The rear derailleur 28 of the transmission 22 includes a guide actuator 28b, a position sensor 28c, and a driver unit 28d. The guide actuator 28b is configured to move the chain guide 28a (FIG. 2) to shift the bicycle chain C relative to the rear sprocket 34. Examples of the guide actuator 28b includes a DC motor and a stepper motor. The position sensor 28c is configured to sense a current position of the guide actuator 28b. Examples of the position sensor 28c includes a potentiometer, a rotary encoder, and a hall sensor. The driver unit 28d is configured to control the guide actuator 28b based on the current position of the guide actuator 28b and driving signals from the controller 40. The controller 40 is configured to generate the driving signals based on the command signal (i.e., the first input operation) outputted from the first input device 38. The controller 40 stores the current position of the guide actuator 28b as the current gear ratio in the memory M1.

The controller 40 controls at least one of the assist device 24 and the transmission 22 based on the current gear ratio, the current assist ratio, and the first input operation. The controller 40 has a control route RT1 (FIG. 3) and controls the gear ratio and the assist ratio in accordance with the control route RT1. The controller 40 stores the control route RT1 in the memory M1.

The controller 40 is configured to change the current gear ratio based on the first input operation (e.g., the first operation) in a first condition. The controller 40 is configured to change the current gear ratio without changing the current assist ratio based on the first input operation (e.g., the first operation) in the first condition. In more detail, the controller 40 is configured to change the current gear ratio into a predetermined gear ratio without changing the current assist ratio based on the first input operation (e.g., the first operation) in the first condition.

As seen in FIG. 3, for example, the controller 40 changes the current gear ratio without changing the current assist ratio based on the first operation (e.g., the upshifting operation) and the control route RT1 in the first condition where the current gear ratio is the gear ratio Gr6 and the current assist ratio is the assist ratio Ar1. Specifically, the controller 40 changes the current gear ratio from the gear ratio Gr6 into the gear ratio Gr7 without changing the current assist ratio based on the first operation (e.g., the upshifting operation) and the control route RT1 in the first condition where the current gear ratio is the gear ratio Gr6 and the current assist ratio is the assist ratio Ar1.

The controller 40 is configured to change the current gear ratio based on the first input operation (e.g., the second operation) in the first condition (or a fourth condition). The controller 40 is configured to change the current gear ratio without changing the current assist ratio based on the second operation in the fourth condition. In more detail, the controller 40 is configured to change the current gear ratio into a predetermined gear ratio without changing the current assist ratio based on the first input operation (e.g., the second operation) in the first condition (or the fourth condition).

For example, the controller 40 changes the current gear ratio without changing the current assist ratio based on the second operation (e.g., the downshifting operation) and the control route RT1 in the first condition (the fourth condition) where the current gear ratio is the gear ratio Gr6 and the current assist ratio is the assist ratio Ar1. Specifically, the controller 40 changes the current gear ratio from the gear ratio Gr6 into the gear ratio Gr5 without changing the current assist ratio based on the second operation (e.g., the downshifting operation) and the control route RT1 in the first condition (the fourth condition) where the current gear ratio is the gear ratio Gr6 and the current assist ratio is the assist ratio Ar1.

The controller 40 is configured to set a first predetermined gear ratio as the current gear ratio based on the first input operation in the first condition to change the current gear ratio into the first predetermined gear ratio. The controller 40 is configured to change the current gear ratio into a predetermined gear ratio without changing the current assist ratio based on one of the upshifting operation and the downshifting operation in the first condition. For example, the controller 40 is configured to set a first predetermined gear ratio Gr7 as the current gear ratio based on the first input operation (e.g., the first operation or the upshifting operation) in the first condition to change the current gear ratio into the first predetermined gear ratio Gr7. The controller 40 is configured to set a first predetermined gear ratio Gr5 as the current gear ratio based on the first input operation (e.g., the second operation or the downshifting operation) in the first condition to change the current gear ratio into the first predetermined gear ratio Gr5. The controller 40 is configured to control the transmission 22 and the assist device 24 based on the current gear ratio and the current assist ratio that are newly set.

The controller 40 is configured to change the current assist ratio based on the first input operation (e.g., the first operation) in a second condition different from the first condition. The controller 40 is configured to change the current gear ratio and the current assist ratio based on the first input operation (e.g., the first operation) in the second condition. In more detail, the controller 40 is configured to change the current gear ratio into a predetermined gear ratio and change the current assist ratio into a predetermined assist ratio based on the first input operation (e.g., the first operation) in the second condition.

For example, the controller 40 changes the current gear ratio and the current assist ratio based on the first operation (e.g., the upshifting operation) and the control route RT1 in the second condition where the current gear ratio is the gear ratio Gr10 and the current assist ratio is the assist ratio Ar2. Specifically, the controller 40 changes the current gear ratio from the gear ratio Gr10 into the gear ratio Gr11 and changes the current assist ratio from the assist ratio Ar2 into the assist ratio Ar3 based on the first operation (e.g., the upshifting operation) and the control route RT1 in the second condition where the current gear ratio is the gear ratio Gr10 and the current assist ratio is the assist ratio Ar2.

The controller 40 is configured to change the current assist ratio based on the first input operation (e.g., the second operation) in the second condition (or a fifth condition different from the fourth condition). The controller 40 is configured to change the current gear ratio and the current assist ratio based on the first input operation (e.g., the second operation) in the second condition (or the fifth condition). In more detail, the controller 40 is configured to change the current gear ratio into a predetermined gear ratio and change the current assist ratio into a predetermined assist ratio based on the first input operation (e.g., the second operation) in the second condition (or the fifth condition).

For example, the controller 40 changes the current gear ratio and the current assist ratio based on the second operation (e.g., the downshifting operation) and the control route RT1 in the second condition (the fifth condition) where the current gear ratio is the gear ratio Gr10 and the current assist ratio is the assist ratio Ar2. Specifically, the controller 40 changes the current gear ratio from the gear ratio Gr10 into the gear ratio Gr9 and changes the current assist ratio from the assist ratio Ar2 into the assist ratio Ar1 based on the second operation (e.g., the downshifting operation) and the control route RT1 in the second condition (the fifth condition) where the current gear ratio is the gear ratio Gr10 and the current assist ratio is the assist ratio Ar2.

The controller 40 is configured to set a second predetermined gear ratio as the current gear ratio and set a first predetermined assist ratio as the current assist ratio based on the first input operation in the second condition to respectively change the current gear ratio and the current assist ratio into the second predetermined gear ratio and the first predetermined assist ratio. The controller 40 is also configured to change the current gear ratio into a predetermined gear ratio and change the current assist ratio into a predetermined assist ratio based on one of the upshifting operation and the downshifting operation in the second condition.

For example, the controller 40 is configured to set a second predetermined gear ratio Gr11 as the current gear ratio and set a first predetermined assist ratio Ar3 as the current assist ratio based on the first input operation (e.g., the first operation or the upshifting operation) in the second condition to respectively change the current gear ratio and the current assist ratio into the second predetermined gear ratio Gr11 and the first predetermined assist ratio Ar3. The controller 40 is configured to set a second predetermined gear ratio Gr9 as the current gear ratio and set a first predetermined assist ratio Ar1 as the current assist ratio based on the first input operation (e.g., the second operation or the downshifting operation) in the second condition to respectively change the current gear ratio and the current assist ratio into the second predetermined gear ratio Gr9 and the first predetermined assist ratio Ar1. The controller 40 is configured to control the transmission 22 and the assist device 24 based on the current gear ratio and the current assist ratio that are newly set.

The first condition, the second condition, the third condition, the fourth condition, and the fifth condition are determined based on the current gear ratio and the current assist ratio.

As seen in FIG. 4, the controller 40 has control data CD1. The controller 40 is configured to store the control data CD1 in the memory M1.

Figure 6:
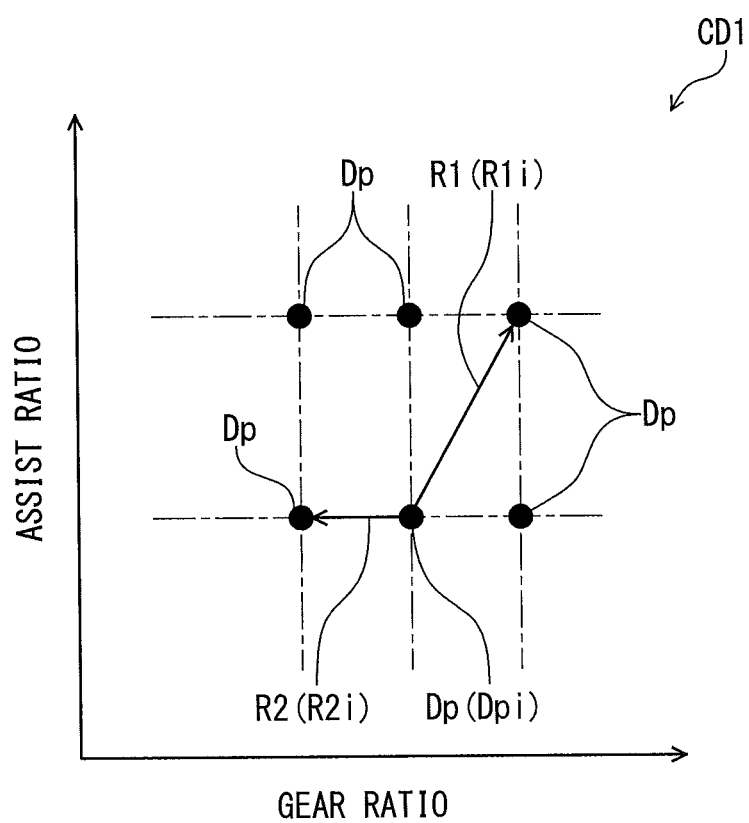
FIG. 6 schematically shows a basic configuration of control data of the bicycle transmission system in accordance with the first embodiment.

FIG. 6 schematically shows a basic configuration of the control data CD1. As seen in FIG. 6, the basic configuration of the control data CD1 is illustrated in a virtual coordinate system. The virtual coordinate system has a vertical axis indicating the assist ratio and a horizontal axis indicating the gear ratio.

The control data CD1 comprises combination information that represents predetermined combinations of the plurality of gear ratios and the plurality of assist ratios. For example, the control data CD1 has a plurality of data points Dp. Each of the data points Dp can be plotted in matrix in the virtual coordinate system. Each of the data points Dp has a combination of the gear ratio and the assist ratio.

The control data CD1 comprises order information that represents an order of control by the controller 40 concerning the combination information. The order information represents relations between the plurality of data points Dp and represents an order of control by the controller 40. In the virtual coordinate system of FIG. 6, the order information is shown as a first path R1 and a second path R2. In the virtual coordinate system, the first path R1 connects two data points Dp, and the second path R2 connects two data points Dp. The first path R1 and the second path R2 are defined for each of the data points Dp in the control data CD1. Each of the first path R1 and the second path R2 has a direction indicated with an arrow. The arrows represent the order of control by the controller 40. For example, the data point Dpi has a first path R1i and a second path R2i as the first path R1 and the second path R2. The first path R1i extends from the data point Dpi to another data point Dp. The second path R2i extends from the data point Dpi to another data point Dp. In the illustrated embodiment, the first path R1 corresponds to the first operation (e.g., the upshifting operation). The second path R2 corresponds to the second operation (e.g., the downshifting operation).

Figure 7:
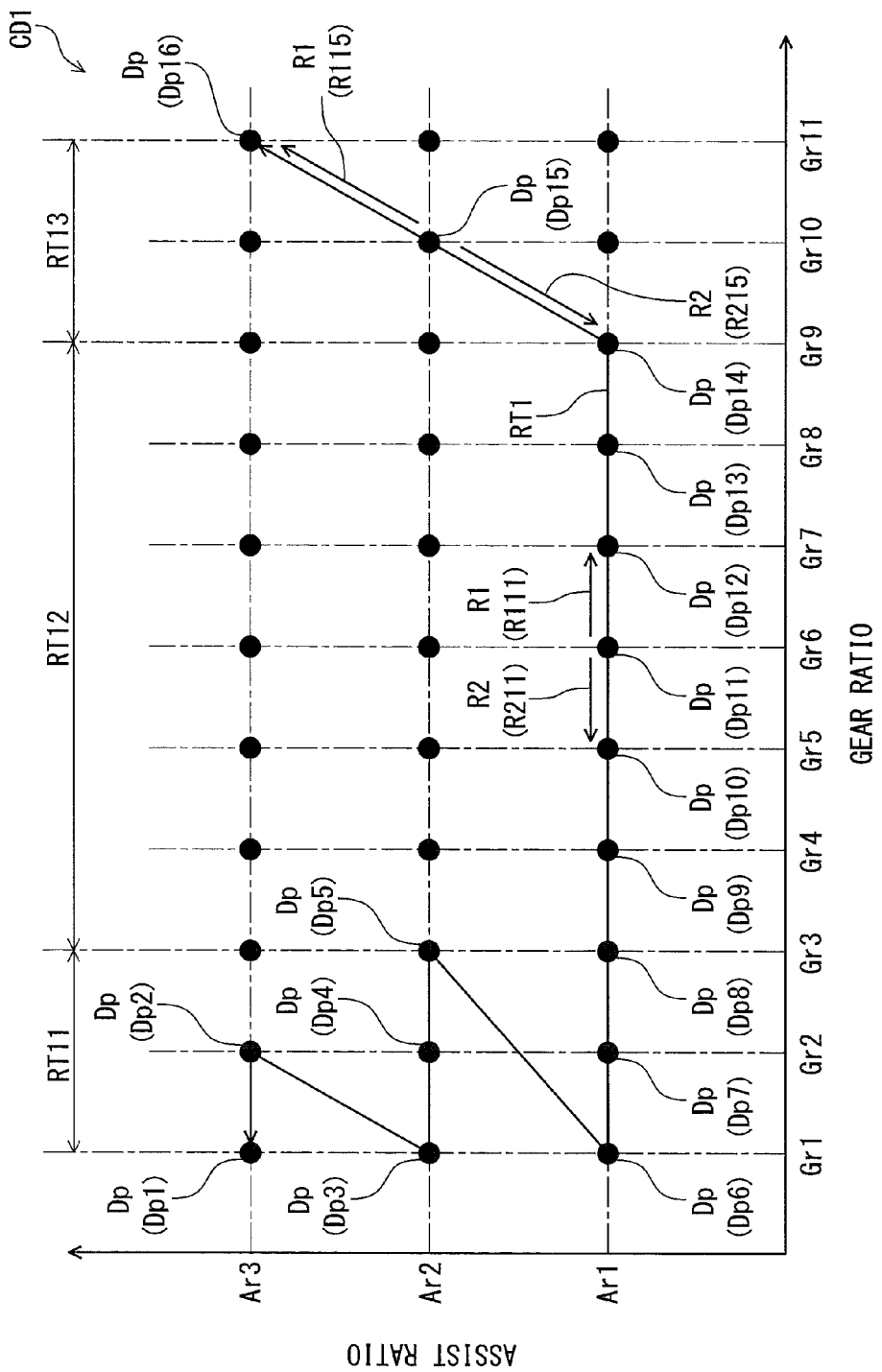
FIG. 7 schematically shows the control data of the bicycle transmission system in accordance with the first embodiment.

FIG. 7 schematically shows the control data CD1 of the bicycle transmission system 100.

As seen in FIG. 7, in the control data CD1, each of the data points Dp has a combination of one of the gear ratios Gr1 to Gr11 and one of the assist ratios Ar1 to Ar3. In the illustrated embodiment, the control data CD1 has data points Dp1 to Dp16 defining the control route RT1. Each of the data points Dp1 to Dp16 has the first path R1 and the second path R2 to provide the control route RT1 except for the data points Dp1 and Dp16 defined at ends of the control route RT1.

The controller 40 is configured to change the current gear ratio into a predetermined gear ratio based on the first input operation and the control data CD1 in the first condition. The controller 40 is configured to change the current gear ratio into a predetermined gear ratio without changing the current assist ratio based on the control data CD1 and one of the upshifting operation and the downshifting operation in the first condition.

For example, the controller 40 changes the current gear ratio Gr6 into the predetermined gear ratio Gr5 or Gr7 based on the first input operation and the control data CD1 in the first condition where the current gear ratio is the gear ratio Gr6 and the current assist ratio is the assist ratio Ar1. The controller 40 changes the current gear ratio Gr6 into the predetermined gear ratio Gr7 without changing the current assist ratio based on the control data CD1 and the upshifting operation in the first condition where the current gear ratio is the gear ratio Gr6 and the current assist ratio is the assist ratio Ar1. The controller 40 changes the current gear ratio Gr6 into the predetermined gear ratio Gr5 without changing the current assist ratio based on the control data CD1 and the downshifting operation in the first condition where the current gear ratio is the gear ratio Gr6 and the current assist ratio is the assist ratio Ar1.

Specifically, the first condition corresponds to the data point Dp11 having the gear ratio Gr6 and the assist ratio Ar1. In the first condition, the controller 40 selects the data point Dp10 or Dp12 based on the data point Dp11 and one of a first path R111 and a second path R211 based on the first input operation. In a case where the first input device 38 receives the upshifting operation as the first input operation, the controller 40 selects the data point Dp12 based on the data point Dp11 and the first path R111. Since the data point Dp12 has the gear ratio Gr7 and the assist ratio Ar1, the controller 40 changes the current gear ratio Gr6 into the gear ratio Gr7 without changing the current assist ratio Ar1 in the first condition.

In a case where the first input device 38 receives the downshifting operation as the first input operation, the controller 40 selects the data point Dp10 based on the data point Dp11 and the second path R211. Since the data point Dp10 has the gear ratio Gr5 and the assist ratio Ar1, the controller 40 changes the current gear ratio Gr6 into the gear ratio Gr5 without changing the current assist ratio Ar1 in the first condition.

The controller 40 is configured to change the current gear ratio into a predetermined gear ratio and change the current assist ratio into a predetermined assist ratio based on the first input operation and the control data CD1 in the second condition. The controller 40 is configured to change the current gear ratio into a predetermined gear ratio and change the current assist ratio into a predetermined assist ratio based on the control data CD1 and one of the upshifting operation and the downshifting operation in the second condition.

For example, the controller 40 changes the current gear ratio Gr10 into the predetermined gear ratio Gr9 or Gr11 based on the first input operation and the control data CD1 in the second condition where the current gear ratio is the gear ratio Gr10 and the current assist ratio is the assist ratio Ar2. The controller 40 changes the current gear ratio Gr10 into the predetermined gear ratio Gr11 and changes the current assist ratio Ar2 into a predetermined assist ratio Ar3 based on the control data CD1 and the upshifting operation in the second condition where the current gear ratio is the gear ratio Gr10 and the current assist ratio is the assist ratio Ar2. The controller 40 changes the current gear ratio Gr10 into the predetermined gear ratio Gr9 and changes the current assist ratio Ar2 into a predetermined assist ratio Ar1 based on the control data CD1 and the downshifting operation in the second condition where the current gear ratio is the gear ratio Gr10 and the current assist ratio is the assist ratio Ar2.

Specifically, the second condition corresponds to the data point Dp15 having the gear ratio Gr10 and the assist ratio Ar2. In the second condition, the controller 40 selects the data point Dp14 or Dp16 based on the data point Dp15 and one of a first path R115 and a second path 8215 based on the first input operation. In a case where the first input device 38 receives the upshifting operation as the first input operation, the controller 40 selects the data point Dp16 based on the data point Dp15 and the first path R115. Since the data point Dp16 has the gear ratio Gr11 and the assist ratio Ar3, the controller 40 changes the current gear ratio Gr10 into the gear ratio Gr11 and changes the current assist ratio Ar2 into the assist ratio Ar3 in the second condition.

In a case where the first input device 38 receives the downshifting operation as the first input operation, the controller 40 selects the data point Dp14 based on the data point Dp15 and the second path 8215. Since the data point Dp14 has the gear ratio Gr9 and the assist ratio Ar1, the controller 40 changes the current gear ratio Gr10 into the gear ratio Gr9 and changes the current assist ratio Ar2 into the assist ratio Ar1 in the second condition.

In the illustrated embodiment, the predetermined combinations selectable based on the upshifting operation are equal to the predetermined combinations selectable based on the downshifting operation. Specifically, the predetermined combinations (the data points Dp1 to Dp16) selectable based on the upshifting operation are equal to the predetermined combinations (the data points Dp1 to Dp16) selectable based on the downshifting operation. The current gear ratio and the current assist ratio are changed along only the control route RT1 in response to each of the upshifting operation and the downshifting operation. However, the predetermined combinations selectable based on the upshifting operation can be at least partially different from the predetermined combinations selectable based on the downshifting operation.

As seen in FIGS. 6 and 7, the first condition comprises a condition that the current gear ratio is between a first gear ratio Gr9 of the plurality of gear ratios and a second gear ratio Gr3 of the plurality of gear ratios. The first gear ratio Gr9 is smaller than a maximum gear ratio Gr11 of the plurality of gear ratios, and the second gear ratio Gr3 is larger than a minimum gear ratio Gr1 of the plurality of gear ratios.

Specifically, the control route RT1 has a low-gear area RT11, a middle-gear area RT12, and a high-gear area RT13. The low-gear area RT11 is defined between the gear ratios Gr1 to Gr3. The middle-gear area RT12 is defined between the gear ratios Gr3 to Gr9. The high-gear area RT13 is defined between the gear ratios Gr9 to Gr11. The assist ratio is constant in the middle-gear area RT12. On the other hand, each of the low-gear area RT11 and the high-gear area RT13 includes an area in which the gear ratio and the assist ratio are changed. The middle-gear area RT12 includes the first condition (e.g., the data points Dp9 to Dp13). The high-gear area RT13 includes the second condition (e.g., the data point Dp15).

Figure 8:
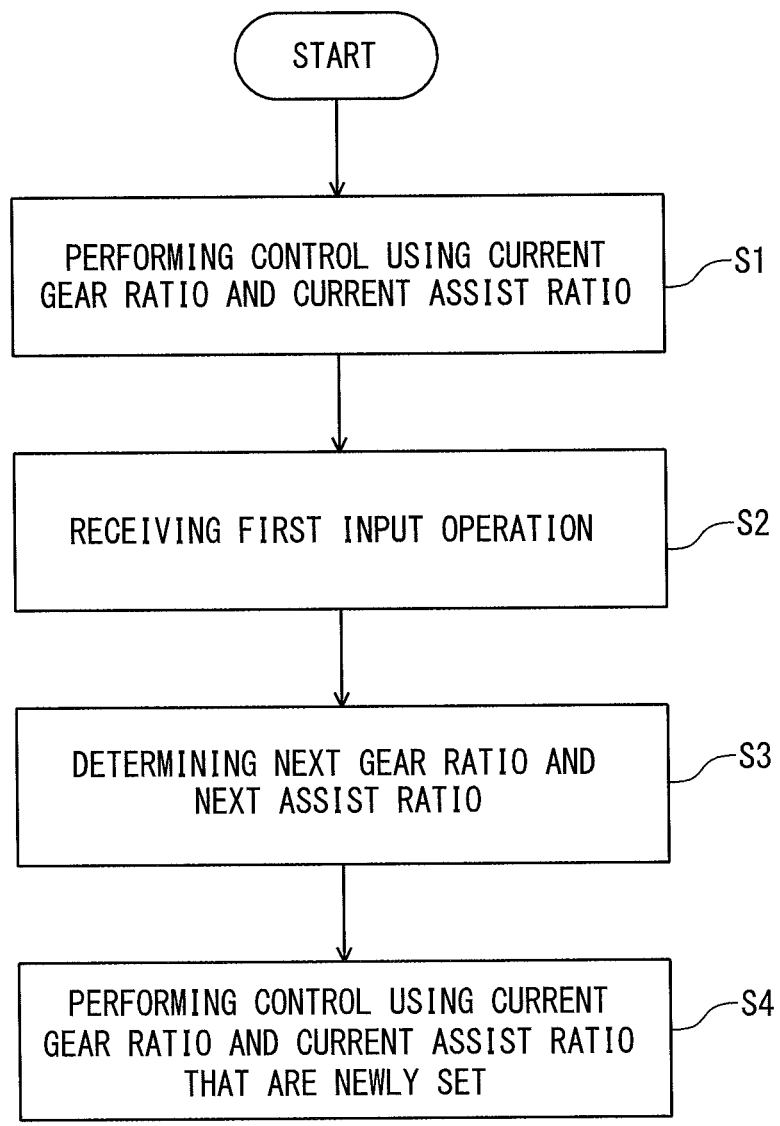
FIG. 8 is a flow chart showing an operation of the bicycle transmission system in accordance with the first embodiment.

Next, an operation of the bicycle transmission system 100 in accordance with this embodiment will be described referring to FIG. 8. FIG. 8 is a flow chart showing the operation of the bicycle transmission system 100 in accordance with this embodiment.

The controller 40 controls the transmission 22 and the assist device 24 based on the current gear ratio and the current assist ratio (step S1). The current gear ratio and the current assist ratio are stored in the memory M1 (FIG. 4) of the controller 40. The first input device 38 receives the first input operation (the upshifting operation or the downshifting operation) from the user (step S2). The controller 40 determines the next gear ratio that is a predetermined gear ratio and the next assist ratio that is a predetermined assist ratio based on the current gear ratio, the current assist ratio, the first input operation, and the control data CD1 (step S3). The controller 40 sets the next gear ratio as the current gear ratio and sets the next gear ratio as the current gear ratio. Then, the controller 40 controls the transmission 22 and the assist device 24 based on the current gear ratio and the current assist ratio that are newly set (step S4). The current gear ratio and the current assist ratio newly set are stored in the memory M1 (FIG. 4) of the controller 40 to update the current gear ratio and the current assist ratio.

In the step S2, when the second electrical input part 38b receives the second operation (the downshifting operation) from the user, the controller 40 follows the first path R1 in the control data CD1 (FIG. 7) to determine the next gear ratio and the next assist ratio in the step S3. On the other hand, in the step S2, when the first electrical input part 38a receives the first operation (the upshifting operation) from the user, the controller 40 follows the second path R2 in the control data CD1 (FIG. 7) to determine the next gear ratio and the next assist ratio in the step S3.

Next, an operation of the controller 40 in the step S3 will be described in more detail referring to FIG. 7. When the first input operation is input via the first input device 38, the control data CD1 is referred by the controller 40. For example, when the first operation (the upshifting operation) is input via the first electrical input part 38a of the first input device 38, the gear ratio Gr7 and the assist ratio Ar1 of the data point Dp12 are respectively extracted from the control data CD1 by the controller 40 based on the data point Dp11 and the first path R111 as the current gear ratio and the current assist ratio in the first condition where the current gear ratio is the gear ratio Gr11 and the current assist ratio is the assist ratio Ar1. Accordingly, the controller 40 controls the transmission 22 and the assist device 24 based on the current gear ratio Gr7 and the current assist ratio Ar1. The current gear ratio Gr7 and the current assist ratio Ar1 that are newly set are stored in the memory M1 of the controller 40.

When the second operation (the downshifting operation) is input via the second electrical input part 38b of the first input device 38, the gear ratio Gr5 and the assist ratio Ar1 of the data point Dp10 are respectively extracted from the control data CD1 by the controller 40 based on the data point Dp11 and the second path 8211 as the current gear ratio and the current assist ratio in the first condition where the current gear ratio is the gear ratio Gr11 and the current assist ratio is the assist ratio Ar1. Accordingly, the transmission 22 and the assist device 24 are controlled by the controller 40 based on the current gear ratio Gr5 and the current assist ratio Ar1. The current gear ratio Gr5 and the current assist ratio Ar1 that are newly set are stored as the current gear ratio and the current assist ratio in the memory M1 of the controller 40.

Under the control by the controller 40, the chain guide 28a of the rear derailleur 28 is moved by the guide actuator 28b from a position corresponding to the gear ratio Gr6 to a position corresponding to the current gear ratio Gr5 or Gr7 that is newly set. Then, the pedaling torque is transmitted via the transmission 22 to the rear wheel 18 at the current gear ratio Gr5 or Gr7. Furthermore, the assisting torque is generated by the assist device 24 based on the current assist ratio Ar1 to assist the rotation of the rear wheel 18.

With the bicycle transmission system 100, the controller 40 changes the current gear ratio into a predetermined gear ratio without changing the current assist ratio based on the first input operation in the first condition. Furthermore, the controller 40 changes the current gear ratio into a predetermined gear ratio and changes the current assist ratio into a predetermined assist ratio based on the first input operation in the second condition different from the first condition. Accordingly, it is possible to change at least one of the gear ratio and the assist ratio in accordance with the first input operation from the first input device 38 in each of the first condition and the second condition. Therefore, it is possible to reduce a burden of the operation of the user during riding the bicycle 10.

Second Embodiment

A bicycle transmission system 200 in accordance with a second embodiment will be described below referring to FIGS. 9 to 11. The bicycle transmission system 200 has substantially the same configuration as the bicycle transmission system 100 except for the control data CD1. Thus, elements having substantially the same function as those in the first embodiment will be numbered the same here, and will not be described and/or illustrated again in detail here for the sake of brevity.

Figure 9:
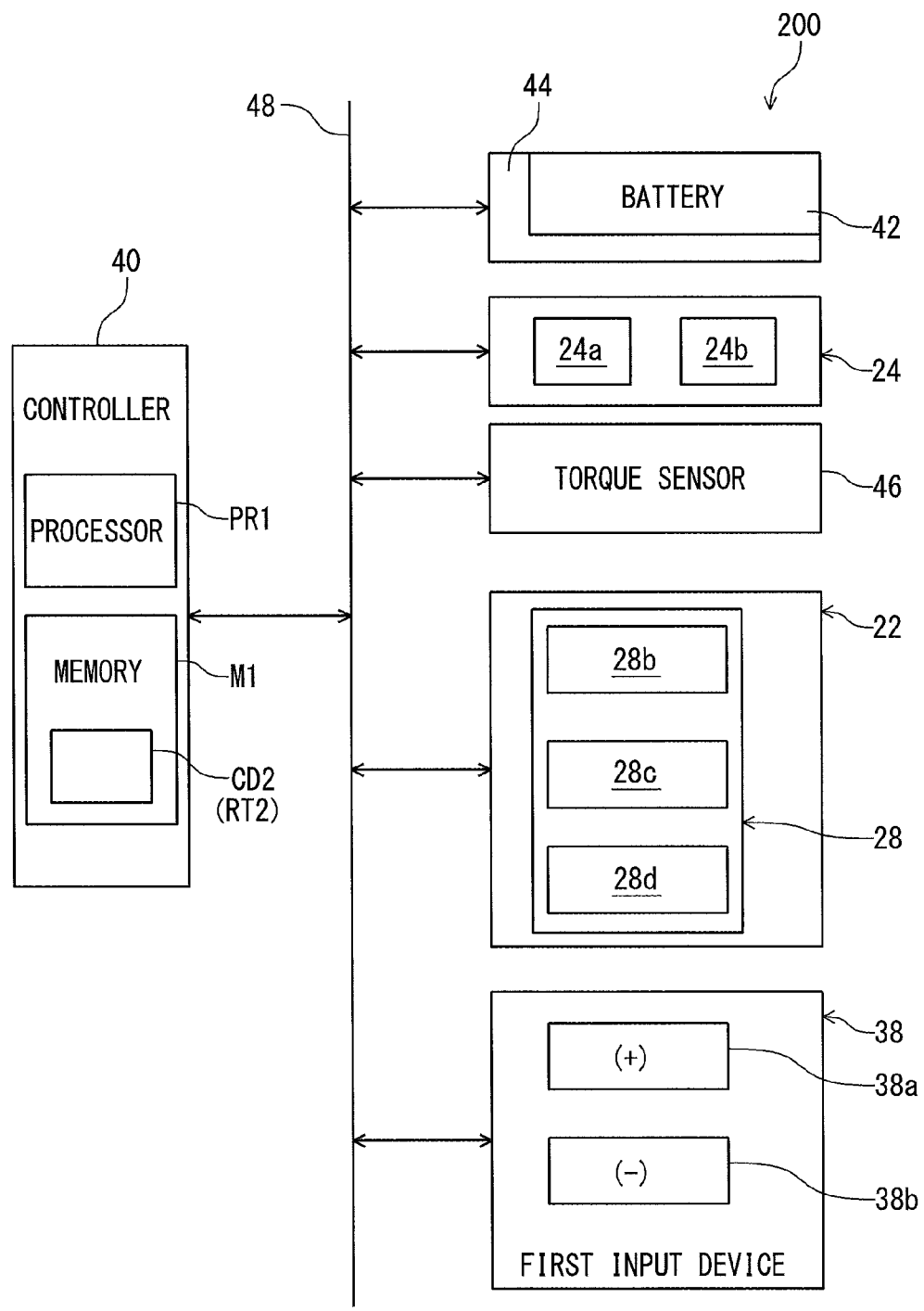
FIG. 9 is a block diagram illustrating a configuration of a bicycle transmission system in accordance with a second embodiment.

As seen in FIG. 9, in the bicycle transmission system 200, the controller 40 has a control route RT2 and controls the gear ratio and the assist ratio in accordance with the control route RT2. The controller 40 stores the control route RT2 in the memory M1. As seen in FIG. 10, the control route RT2 has substantially the same configuration as that of the control route RT1 in accordance with the first embodiment. However, the data points Dp4 and Dp5 are omitted from the control route RT2.

The controller 40 is configured to change the current assist ratio into a predetermined assist ratio without changing the current gear ratio based on the first input operation in a third condition different from the first condition and the second condition.

Figure 10:
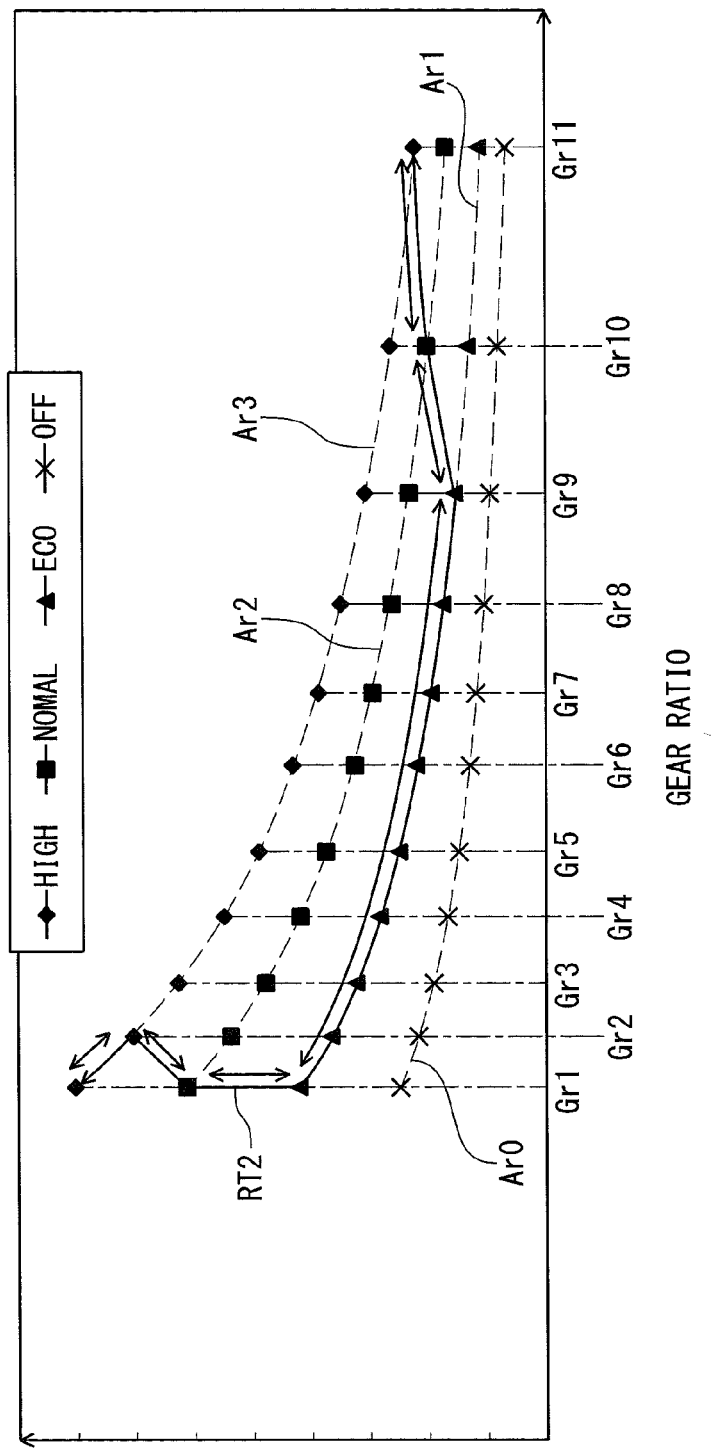
FIG. 10 is a diagram showing a relation between a tangent force of a wheel, gear ratios, and assist ratios in a bicycle equipped with the bicycle transmission system illustrated in FIG. 9.

As seen in FIG. 10, for example, the controller 40 changes the current assist ratio Ar2 into a predetermined assist ratio Ar1 without changing the current gear ratio Gr1 based on the first operation (the upshifting operation) in a third condition where the current gear ratio is the gear ratio Gr1 and the current assist ratio is the assist ratio Ar2.

The controller 40 changes the current assist ratio Ar1 into a predetermined assist ratio Ar2 without changing the current gear ratio Gr1 based on the second operation (the downshifting operation) in a third condition where the current gear ratio is the gear ratio Gr1 and the current assist ratio is the assist ratio Ar1.

As seen in FIG. 9, the controller 40 has control data CD2. The control data CD2 indicates the control route RT2. As seen in FIG. 11, the control data CD2 has substantially the same configuration as that of the control data CD1 in accordance with the first embodiment.

The controller 40 is configured to change the current assist ratio into a predetermined assist ratio based on the first input operation and the control data CD2 in the third condition. The controller 40 is configured to change the current assist ratio into a predetermined assist ratio without changing the current gear ratio based on the control data CD2 and one of the upshifting operation and the downshifting operation in the third condition.

Figure 11:
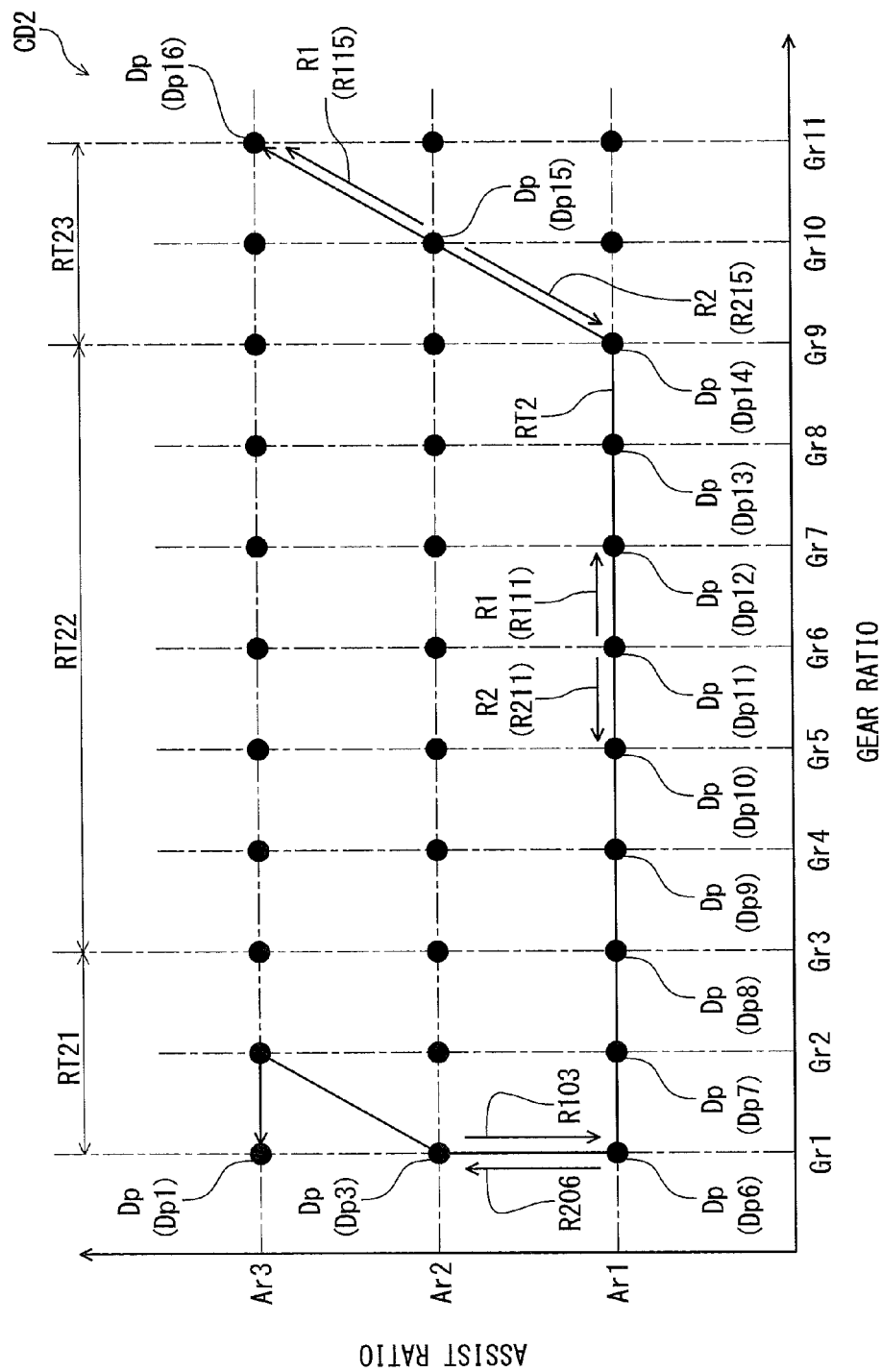
FIG. 11 schematically shows control data of the bicycle transmission system in accordance with the second embodiment.

As seen in FIG. 11, for example, the controller 40 changes the current assist ratio Ar2 into the predetermined assist ratio Ar1 without changing the current gear ratio Gr1 based on the control data CD2 and the upshifting operation in the third condition where the current gear ratio is the gear ratio Gr1 and the current assist ratio is the assist ratio Ar2. Similarly, the controller 40 changes the current assist ratio Ar1 into the predetermined assist ratio Ar2 without changing the current gear ratio Gr1 based on the control data CD2 and the downshifting operation in the third condition where the current gear ratio is the gear ratio Gr1 and the current assist ratio is the assist ratio Ar1.

Specifically, the third condition corresponds to the data points Dp3 and Dp6. In the third condition (the data point Dp3), the controller 40 selects the data point Dp6 based on the data point Dp3 and one of a first path R103 based on the first operation (the upshifting operation). Since the data point Dp6 has the gear ratio Gr1 and the assist ratio Ar1, the controller 40 changes the current assist ratio Ar2 into the assist ratio Ar1 without changing the current gear ratio Gr1 in the third condition (the data point Dp3).

Similarly, in the third condition (the data point Dp6), the controller 40 selects the data point Dp3 based on the data point Dp6 and one of a second path R206 based on the second operation (the downshifting operation). Since the data point Dp3 has the gear ratio Gr1 and the assist ratio Ar2, the controller 40 changes the current assist ratio Ar1 into the assist ratio Ar2 without changing the current gear ratio Gr1 in the third condition (the data point Dp6).

As seen in FIG. 11, the control route RT2 has a low-gear area RT21, a middle-gear area RT22, and a high-gear area RT23. The low-gear area RT21 is defined between the gear ratios Gr1 and Gr2. The middle-gear area RT22 is defined between the gear ratios Gr2 to Gr9. The high-gear area RT23 is defined between the gear ratios Gr9 to Gr11. The assist ratio is constant in the middle-gear area RT22. On the other hand, each of the low-gear area RT21 and the high-gear area RT23 includes an area in which the gear ratio and the assist ratio are changed. The low-gear area RT21 includes the third condition (e.g., the data points Dp3 and Dp6). The middle-gear area RT22 includes the first condition (e.g., the data points Dp9 to Dp13). The high-gear area RT23 includes the second condition (e.g., the data point Dp15).

With the bicycle transmission system 200, it is possible to obtain substantially the same advantageous effects as those of the bicycle transmission system 100.

Third Embodiment

A bicycle transmission system 300 in accordance with a third embodiment will be described below referring to FIGS. 12 to 14. The bicycle transmission system 300 has substantially the same configuration as the bicycle transmission system 100 except for the control data CD1. Thus, elements having substantially the same function as those in the above embodiments will be numbered the same here, and will not be described and/or illustrated again in detail here for the sake of brevity.

Figure 12:
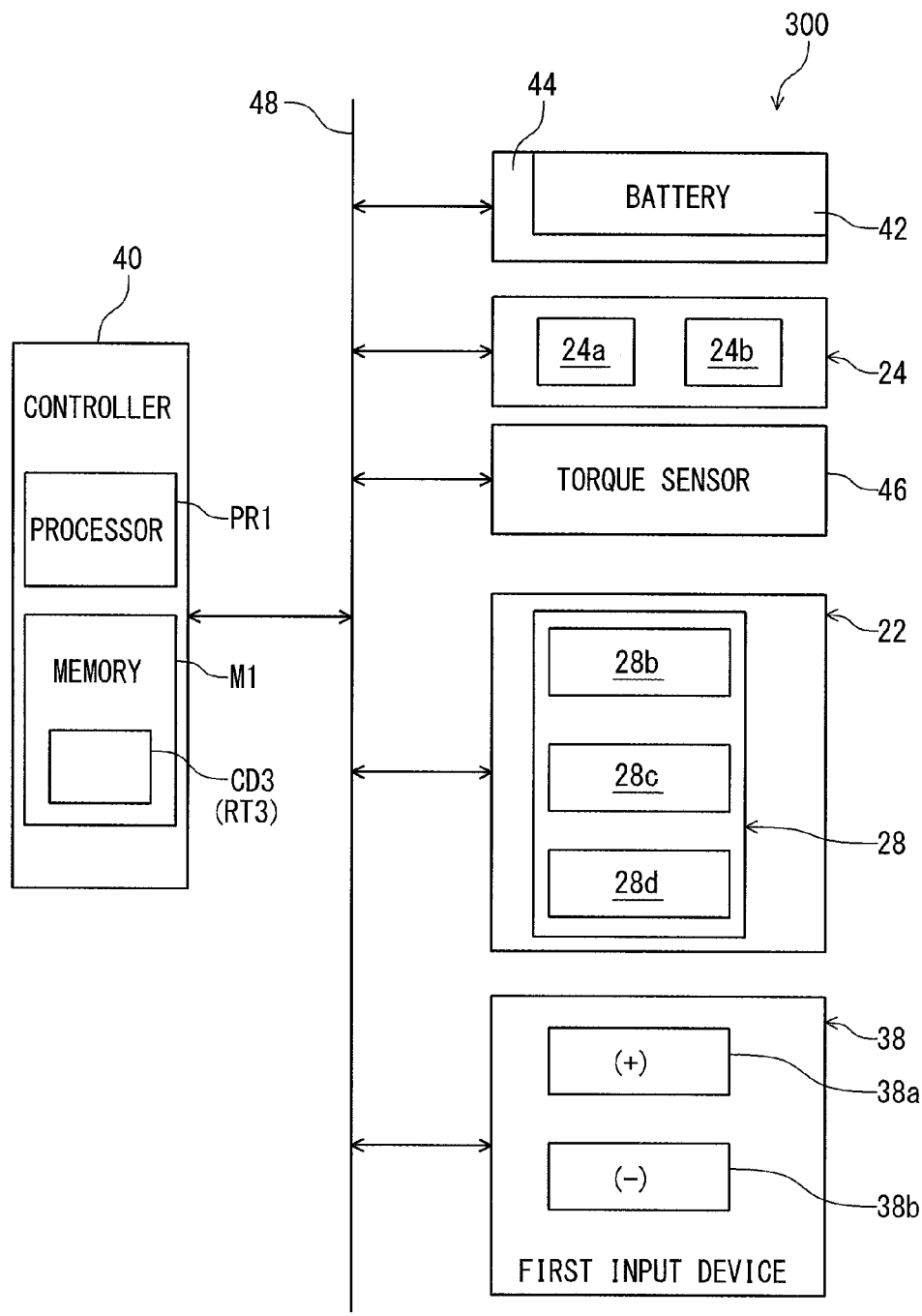
FIG. 12 is a block diagram illustrating a configuration of a bicycle transmission system in accordance with a third embodiment.
Figure 13:
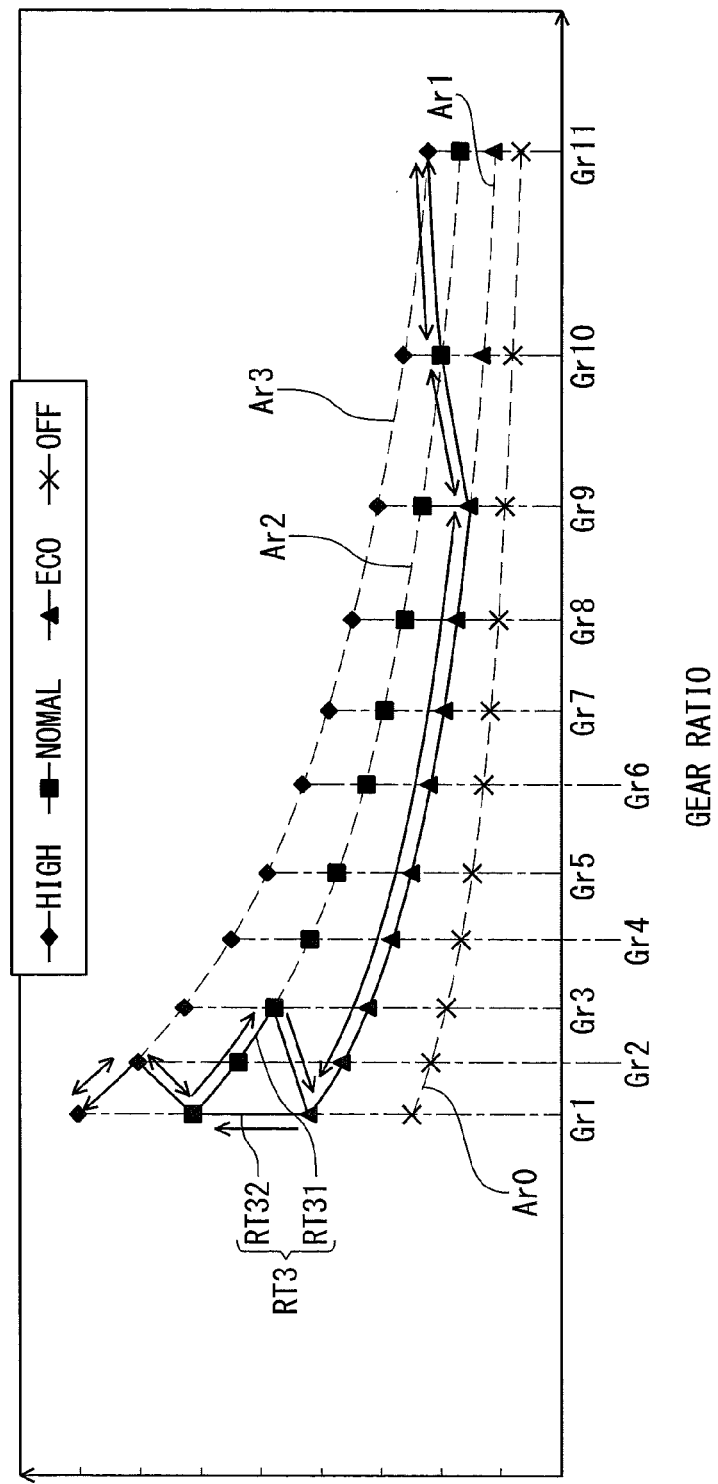
FIG. 13 is a diagram showing a relation between a tangent force of a wheel, gear ratios, and assist ratios in a bicycle equipped with the bicycle transmission system illustrated in FIG. 12.

As seen in FIG. 12, in the bicycle transmission system 300, the controller 40 has a control route RT3 and controls the gear ratio and the assist ratio in accordance with the control route RT3. As seen in FIG. 13, in the illustrated embodiment, the control route RT3 includes an upshifting control route RT31 and a downshifting control route RT32.

The upshifting control route RT31 is equal to the control route RT1 in accordance with the first embodiment. The downshifting control route RT32 is equal to the control route RT2 in accordance with the second embodiment. While the upshifting control route RT31 is partly equal to the downshifting control route RT32, the upshifting control route RT31 is partly different from the downshifting control route RT32. The controller 40 stores the control route RT3 in the memory M1.

Figure 14:
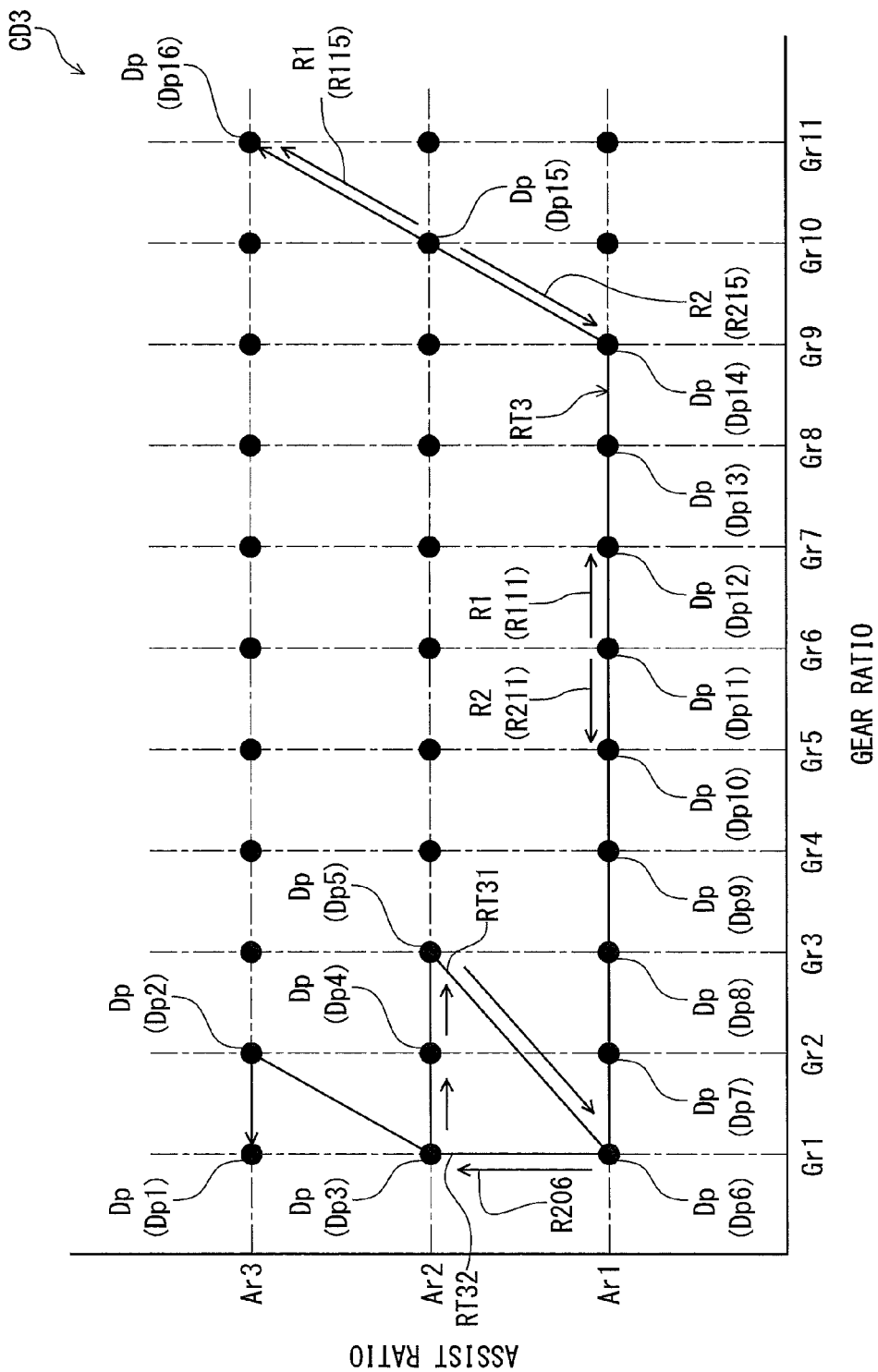
FIG. 14 schematically shows control data of the bicycle transmission system in accordance with the third embodiment.

As seen in FIG. 14, the controller 40 has control data CD3. The control data CD3 indicates the control route RT3. The control data CD3 comprises combination information that represents predetermined combinations of the plurality of gear ratios and the plurality of assist ratios. The predetermined combinations selectable based on the upshifting operation are at least partly different from the predetermined combinations selectable based on the downshifting operation.

In the illustrated embodiment, the predetermined combinations selectable based on the upshifting operation are partly different from the predetermined combinations selectable based on the downshifting operation. While the data points Dp4 and Dp5 are selectable based on the upshifting operation in the upshifting control route RT31, the data points Dp4 and Dp5 are not selectable based on the downshifting operation in the downshifting control route RT32. However, the predetermined combinations selectable based on the upshifting operation can be entirely different from the predetermined combinations selectable based on the downshifting operation if needed and/or desired.

With the bicycle transmission system 300, it is possible to obtain substantially the same advantageous effects as those of the bicycle transmission system 100.

Fourth Embodiment

A bicycle transmission system 400 in accordance with a fourth embodiment will be described below referring to FIGS. 15 and 16. The bicycle transmission system 400 has substantially the same configuration as the bicycle transmission system 100 except for a setting device. Thus, elements having substantially the same function as those in the first embodiment will be numbered the same here, and will not be described and/or illustrated again in detail here for the sake of brevity.

Figure 15:
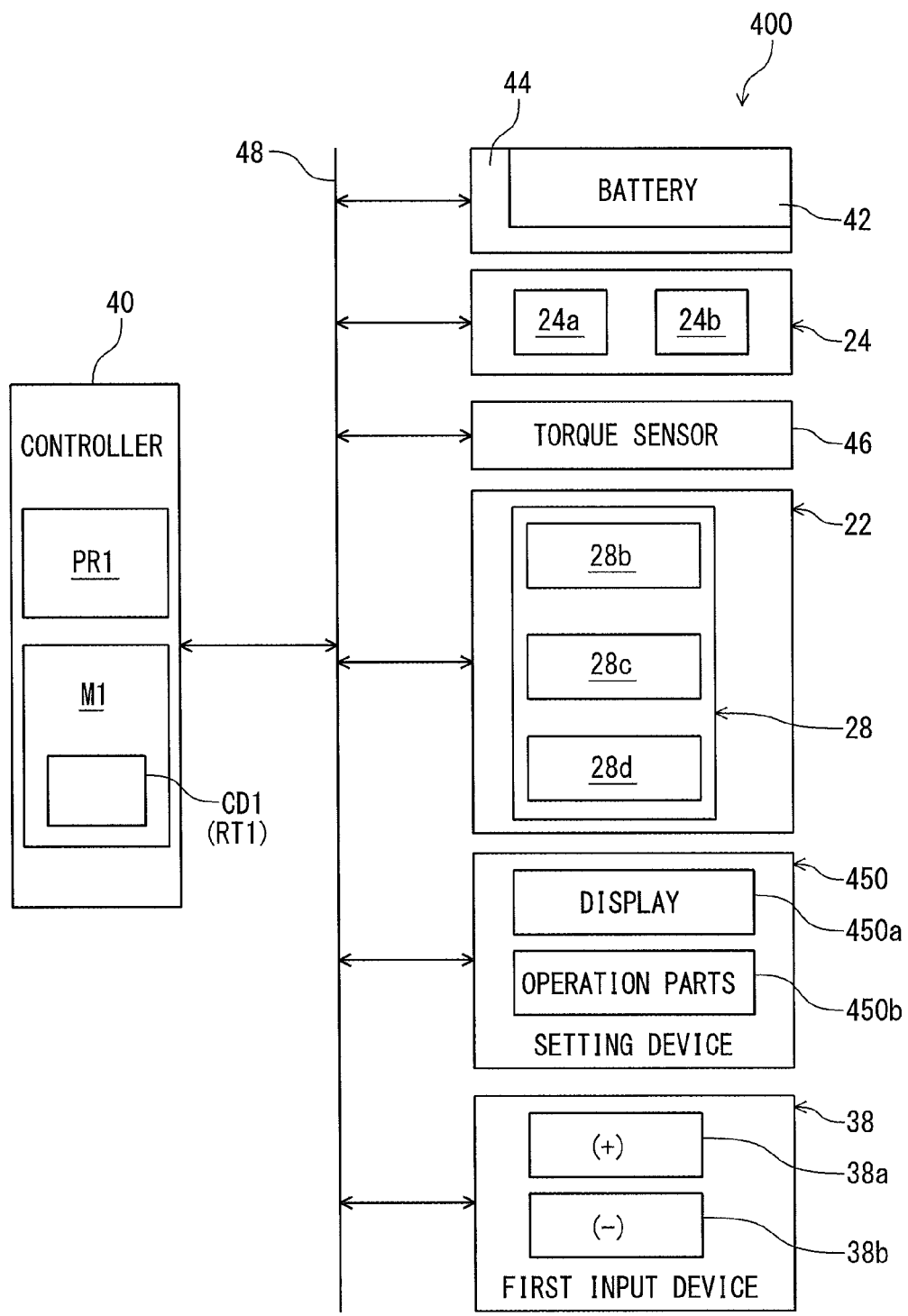
FIG. 15 is a block diagram illustrating a configuration of a bicycle transmission system in accordance with a fourth embodiment.

FIG. 15 is a block diagram illustrating the configuration of the bicycle transmission system 400 in accordance with this embodiment. The bicycle transmission system 400 comprises a setting device 450 via which the user is to change the order information. The order information is stored in the memory M1 as the control data CD1. FIG. 16 is an enlarged plan view of the handlebar 14. As seen in FIG. 16, the setting device 450 is detachably attached to the handlebar 14. As seen in FIGS. 15 and 16, the setting device 450 comprises a display 450a and operation parts 450b. The setting device 450 can be a portable device such as a cycle computer and a smart phone, or a personal computer.

As seen in FIG. 15, the setting device 450 is operatively connected to the controller 40. In the illustrated embodiment, the setting device 450 is connected to the controller 40 through the PLC network 48. However, the setting device 450 can be wirelessly connected to the controller 40 if needed and/or desired.

The user can change the order information in the controller 40 via the setting device 450. For example, via the setting device 450, the user can change a first path of the data point Dp3 to the first path R103 (FIG. 11) and change a second path of the data point Dp6 to the second path R206 (FIG. 11) to change the control data CD1 (FIG. 7) to the control data CD2 (FIG. 11).

Figure 16:
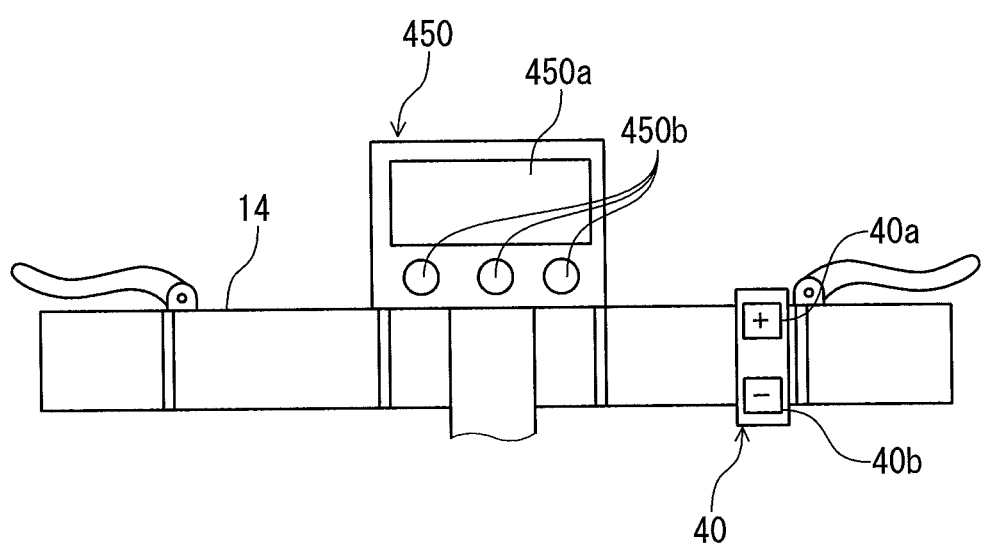
FIG. 16 is an enlarged plan view of a handlebar of a bicycle equipped with the bicycle transmission system in accordance with the fourth embodiment.

As seen in FIGS. 15 and 16, the display 450a displays various images. For example, the display 450a displays a setting image so that the user can easily change the order information in the controller 40. The user operates the operation parts 450b to change the order information in the controller 40. When the operation parts 450b receive setting operation from the user, the setting device 450 generates a command signal in response to the setting operation. Then, the setting device 450 outputs the command signal to the controller 40. The controller 40 changes the order information based on the command signal (or the setting operation).

With the bicycle transmission system 400, it is possible to obtain substantially the same advantageous effects as those of the bicycle transmission system 100.

Furthermore, with the bicycle transmission system 400, it is possible to change the order information such as the first path R103 (FIG. 11) and the second path R206 (FIG. 11) via the setting device 450 to change the control route RT1.

Fifth Embodiment

A bicycle transmission system 500 in accordance with a fifth embodiment will be described below referring to FIGS. 17 and 18. The bicycle transmission system 500 has substantially the same configuration as the bicycle transmission system 100 except for a mode selector. Thus, elements having substantially the same function as those in the above embodiments will be numbered the same here, and will not be described and/or illustrated again in detail here for the sake of brevity.

Figure 17:
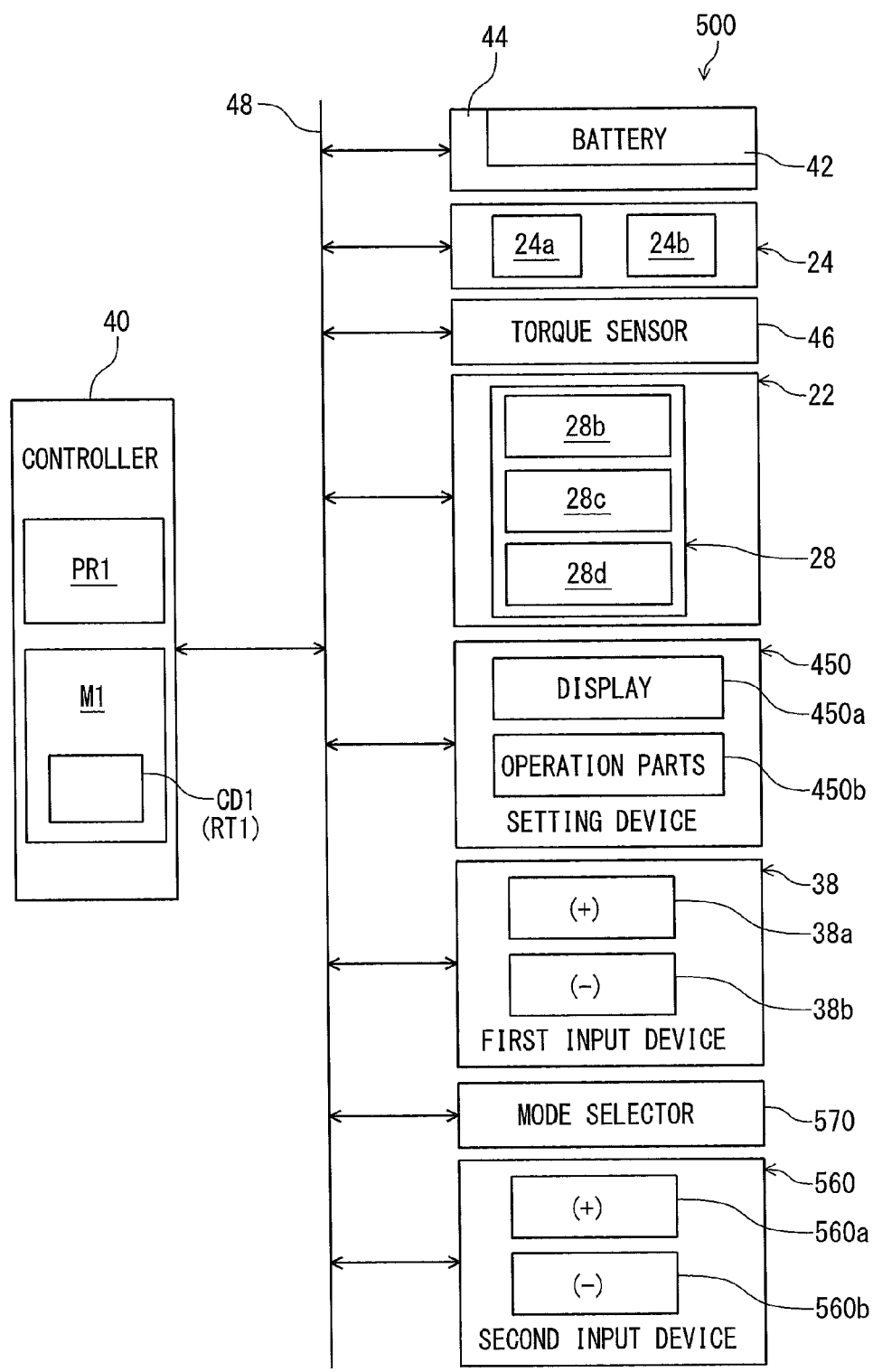
FIG. 17 is a block diagram illustrating a configuration of a bicycle transmission system in accordance with a fifth embodiment.

FIG. 17 is a block diagram illustrating the configuration of the bicycle transmission system 500 in accordance with this embodiment. The bicycle transmission system 500 comprises a second input device 560 configured to receive a second input operation from the user. The bicycle transmission system 500 comprises a mode selector 570 via which the user is to select one of a first mode and a second mode.

As seen in FIG. 17, the second input device 560 and the mode selector 570 are operatively connected to the controller 40. In the illustrated embodiment, the second input device 560 and the mode selector 570 are connected to the controller 40 through the PLC network 48. However, the second input device 560 and the mode selector 570 can be wirelessly connected to the controller 40. The setting device 450 can be omitted from the bicycle transmission system 500 if needed and/or desired.

Figure 18:
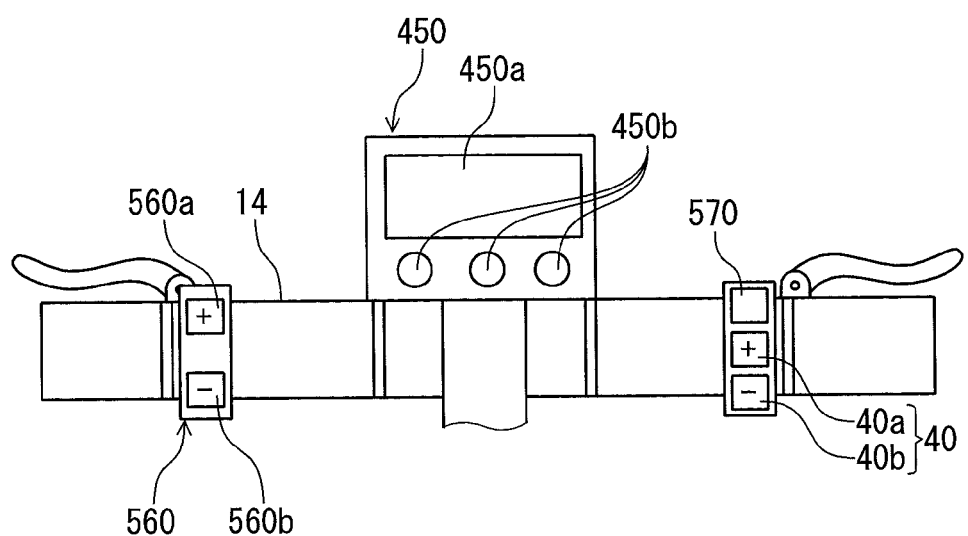
FIG. 18 is an enlarged plan view of a handlebar of a bicycle equipped with the bicycle transmission system in accordance with the fifth embodiment.

FIG. 18 is an enlarged plan view of the handlebar 14. As seen in FIG. 18, the mode selector 570 is integrated in the first input device 38. However, the mode selector 570 can be provided separately from the first input device 38 if needed and/or desired. Furthermore, the mode selector 570 can be integrated in one of the setting device 450 and the second input device 560 if needed and/or desired.

As seen in FIGS. 17 and 18, the second input device 560 has a third electrical input part 560a and a fourth electrical input part 560b. The second input operation comprises a third operation and a fourth operation. The third electrical input part 560a is configured to receive the third operation from the user. The controller 40 is operatively connected to the third electrical input part 560a. The fourth electrical input part 560b is configured to receive the fourth operation from the user. The controller 40 is operatively connected to the fourth electrical input part 560b.

When the second input operation is performed on the second input device 560, the second input device 560 generates a command signal corresponding to the second input operation and outputs the command signal to the controller 40. The controller 40 controls the assist device 24 based on the command signal (e.g., the second input operation).

The mode selector 570 will be described below referring to FIGS. 17 and 18.

The controller 40 has a first mode and a second mode. One of the first mode and the second mode is selected by the user via the mode selector 570. When the user selects the first mode via the mode selector 570, the controller 40 enters the first mode. When the user selects the second mode via the mode selector 570, the controller 40 enters the second mode.

The controller 40 controls the transmission 22 and the assist device 24 based on the first input operation in the first mode regardless of the second input operation. Namely, in the first mode, the controller 40 controls the transmission 22 and the assist device 24 as described in the first to fourth embodiments.

On the other hand, the controller 40 controls the transmission 22 based on the first input operation in the second mode regardless of the second input operation. The controller 40 controls the assist device 24 based on the second input operation in the second mode regardless of the first input operation. Namely, in the second mode, the transmission 22 is operated by only the first input operation through the first input device 38, and the assist device 24 is operated by only the second input operation through the second input device 560.

When one of the first mode and the second mode is selected by the user via the mode selector 570, the mode selector 570 generates a command signal corresponding to the mode-select operation and outputs the command signal to the controller 40. Specifically, when the first mode is selected via the mode selector 570, the mode selector 570 generates a first-mode signal corresponding to the first mode. The controller 40 enters the first mode based on the first-mode signal. When the second mode is selected via the mode selector 570, the mode selector 570 generates a second-mode signal corresponding to the second mode. The controller 40 enters the second mode based on the second-mode signal.

An operation of the bicycle transmission system 500 in accordance with this embodiment will be described.

When the user selects the first mode via the mode selector 570, the controller 40 enters the first mode. In the first mode, the controller 40 controls the transmission 22 and the assist device 24 as described in the first to fourth embodiments. Therefore, the operation of the controller 40 in the first mode is not described in detail here for the sake of brevity.

When the user selects the second mode via the mode selector 570, the controller 40 enters the second mode. In the second mode, the transmission 22 is operated by the user via the first input device 38, and the assist device 24 is operated by the user via the second input device 560. Therefore, in the second mode, the user can separately control the transmission 22 and the assist device 24.

In the second mode, when the first electrical input part 38a receives the first operation (e.g., the upshifting operation) from the user, the controller 40 controls the transmission 22 to upshift (increase the gear ratio) based on the upshifting operation. The controller 40 controls the transmission 22 to upshift by one speed stage among the gear ratios Gr1 to Gr11 based on the upshifting operation. In the second mode, when the second electrical input part 38b receives the second operation (e.g., the downshifting operation) from the user, the controller 40 controls the transmission 22 to downshift (decrease the gear ratio) based on the downshifting operation. The controller 40 controls the transmission 22 to downshift by one speed stage among the gear ratios Gr1 to Gr11 based on the downshifting operation.

In the second mode, when the third electrical input part 560a receives the third operation from the user, the controller 40 controls the assist device 24 to increase the assist ratio based on the third operation. The controller 40 controls the assist device 24 to increase the assist ratio by one step among the assist ratios Ar1 to Ar3. In the second mode, when the fourth electrical input part 560b receives the fourth operation from the user, the controller 40 controls the assist device 24 to decrease the assist ratio based on the fourth operation. The controller 40 controls the assist device 24 to decrease the assist ratio by one step among the assist ratios Ar1 to Ar3.

With the bicycle transmission system 500, since the controller 40 has the first mode, it is possible to obtain substantially the same advantageous effects as those of the bicycle transmission system 100.

Furthermore, with the bicycle transmission system 500, it is possible to switch a mode of the controller 40 between the first mode and the second mode via the mode selector 570. Therefore, the bicycle transmission system 500 can improve user's convenience.

Sixth Embodiment

A bicycle transmission system 600 in accordance with a sixth embodiment will be described below referring to FIGS. 19 to 22. The bicycle transmission system 600 has substantially the same configuration as the bicycle transmission system 100 except for the front sprocket. Thus, elements having substantially the same function as those in the above embodiments will be numbered the same here, and will not be described and/or illustrated again in detail here for the sake of brevity.

Figure 19:
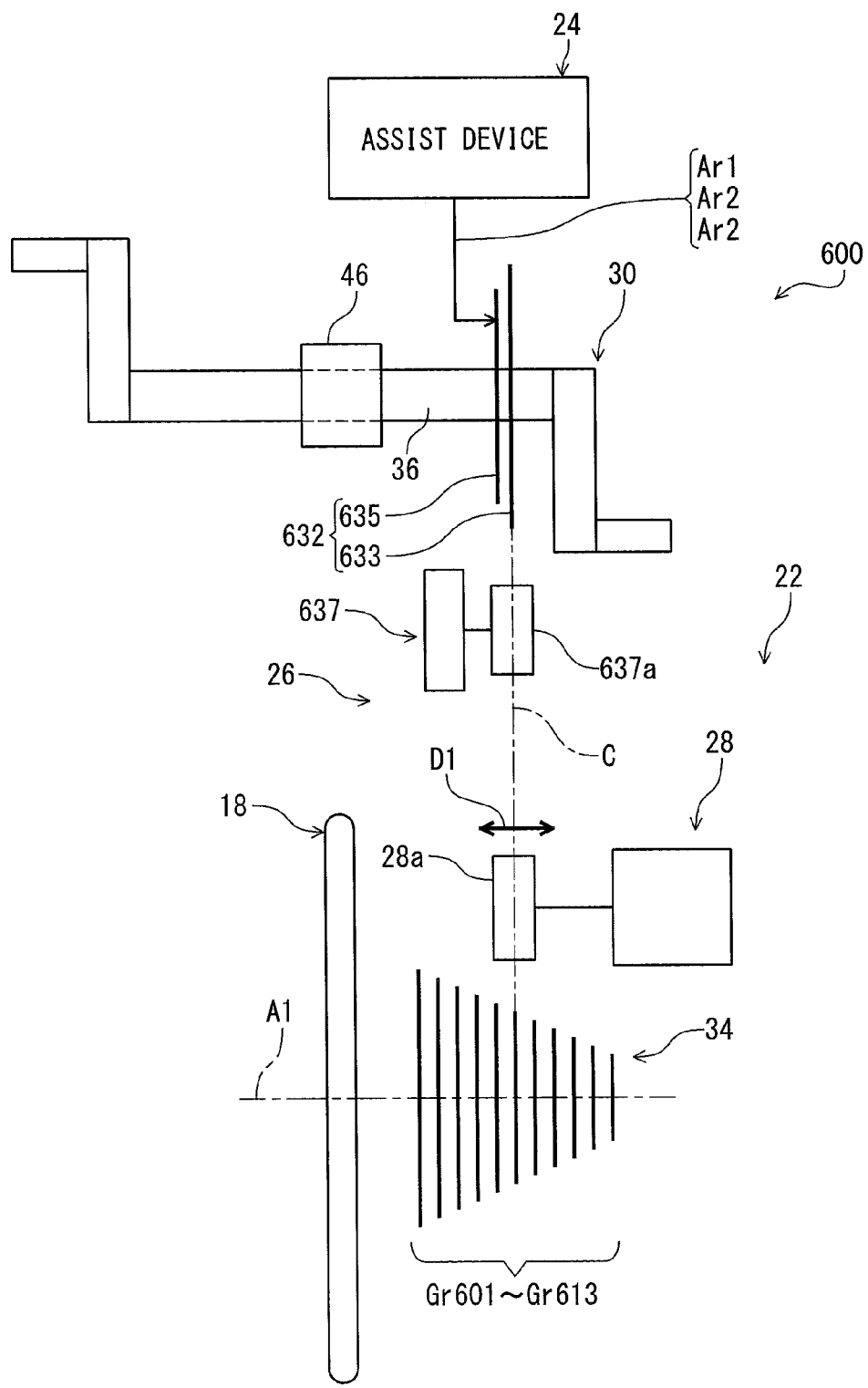
FIG. 19 is a schematic view of the bicycle transmission system in accordance with a sixth embodiment.
Figure 20:
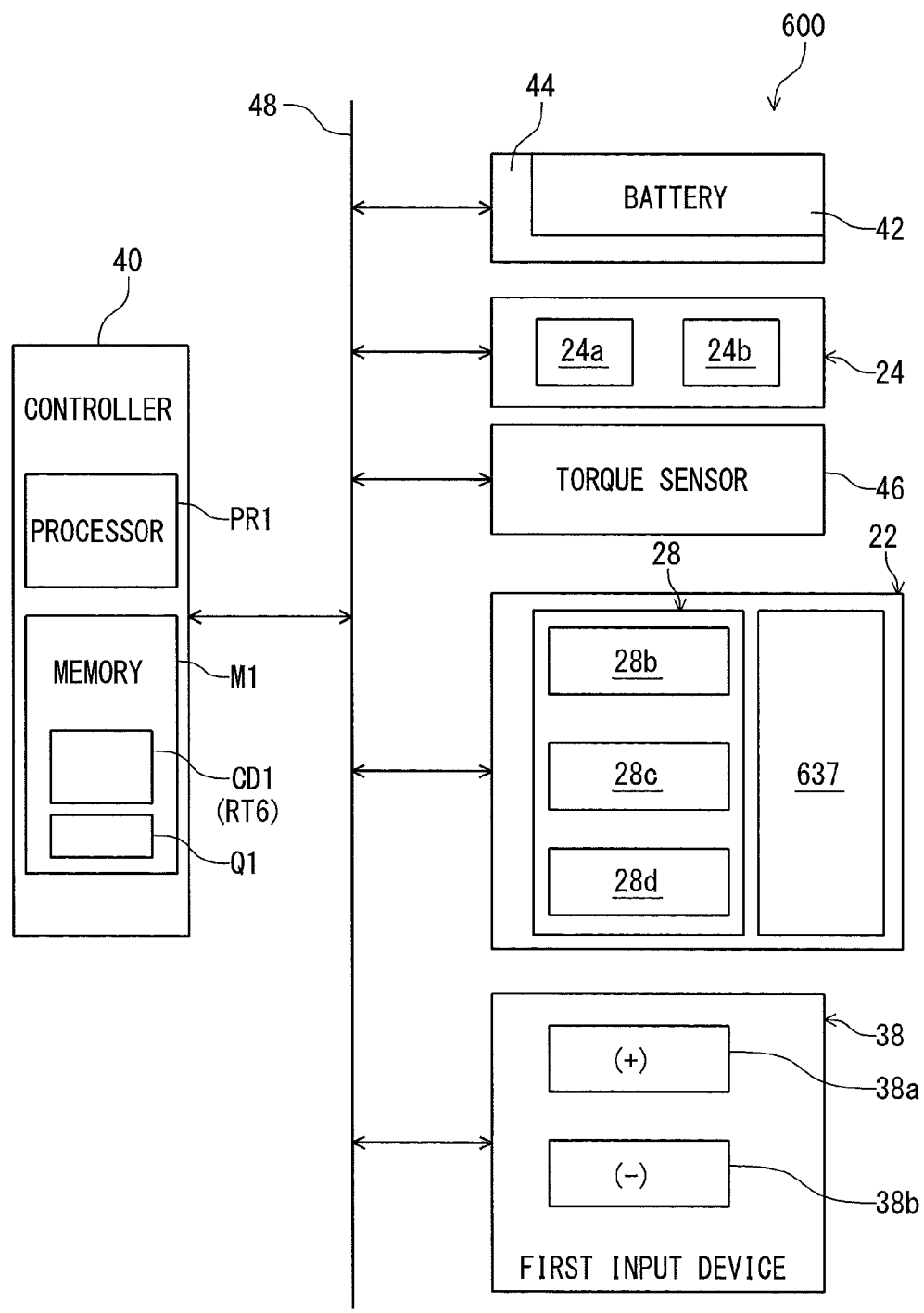
FIG. 20 is a block diagram illustrating a configuration of a bicycle transmission system in accordance with the sixth embodiment.

As seen in FIG. 19, in the bicycle transmission system 600, the transmission 22 includes a front sprocket 632 instead of the front sprocket 32 in accordance with the first embodiment. The front sprocket 632 includes front sprocket elements 633 and 635. The transmission 22 further includes a front derailleur 637 configured to shift the bicycle chain C relative to the front sprocket 632. The front derailleur 637 includes a chain guide 637a to guide the bicycle chain C between the front sprocket elements 633 and 635 in the axial direction D1 to change a speed stage among a plurality of speed stages. As seen in FIG. 20, the front derailleur 637 is operatively connected to the controller 40. The controller 40 controls the front derailleur 637 based on the first input operation received via the first input device 38. The front derailleur 637 includes a guide actuator, a position sensor, and a driver unit which respectively have substantially the same configurations as those of the guide actuator 28b, the position sensor 28c, and the driver unit 28d of the rear derailleur 28. Thus, they will not be described and/or illustrated in detail here for the sake of brevity.

FIG. 21 shows a shift table including gear ratios, a total number of teeth of each sprocket element in the front sprocket 632 ("FS"), and a total number of teeth of each sprocket element in the rear sprocket 34 ("RS"). The controller 40 is configured to store the shift table for the bicycle transmission system 600 in the memory M1. In the front sprocket 632, the transmission 22 has low and top gears as the speed stage. In the rear sprocket 34, the transmission 22 has first to eleventh gears as the speed stage.

As seen in FIGS. 20 and 21, the controller 40 is configured to store a transmission route Q1 in the memory M1. The transmission route Q1 includes synchro-shift points which are each circled with a single circle. In a synchro mode, the controller 40 is configured to synchronously control the front derailleur 637 and the rear derailleur 28 to respectively shift speed stages at the speed stage corresponding to the synchro-shift point in response to a single shift signal.

As seen FIG. 21, the transmission route Q1 is used for both upshifting and downshifting. In the transmission route Q1, first to seventh gears of the rear sprocket 34 are used for low gear of the front sprocket 632. Sixth to eleventh gears of the rear sprocket 34 are used for top gear of the front sprocket 632. The transmission 22 has thirteen speed stages (i.e., thirteen gear ratios Gr601 to Gr613) in accordance with the transmission route Q1.

In a case where the rear sprocket 34 is in sixth gear and the front sprocket 632 is in low gear in the synchro mode, in the rear sprocket 34, the controller 40 controls the transmission 22 to upshift in response to the upshifting operation. Meanwhile, in the front sprocket 632, the controller 40 controls the transmission 22 to keep in low gear regardless of the shift signals.

In a case where the rear sprocket 34 is in seventh gear and the front sprocket 632 is in top gear in the synchro mode, in the rear sprocket 34, the controller 40 controls the transmission 22 to downshift in response to the downshifting operation. Meanwhile, in the front sprocket 632, the controller 40 controls the transmission 22 to keep in top gear regardless of the shift signals.

In a case where the rear sprocket 34 is in seventh gear and the front sprocket 632 is in low gear in the synchro mode, the controller 40 controls the transmission 22 to downshift in the rear sprocket 34 and to upshift in the front sprocket 632 in response to the upshifting operation.

In a case where the rear sprocket 34 is in sixth gear and the front sprocket 632 is in top gear in the synchro mode, the controller 40 controls the transmission 22 to upshift in the rear sprocket 34 and to downshift in the front sprocket 632 in response to the downshifting operation.

Figure 22:
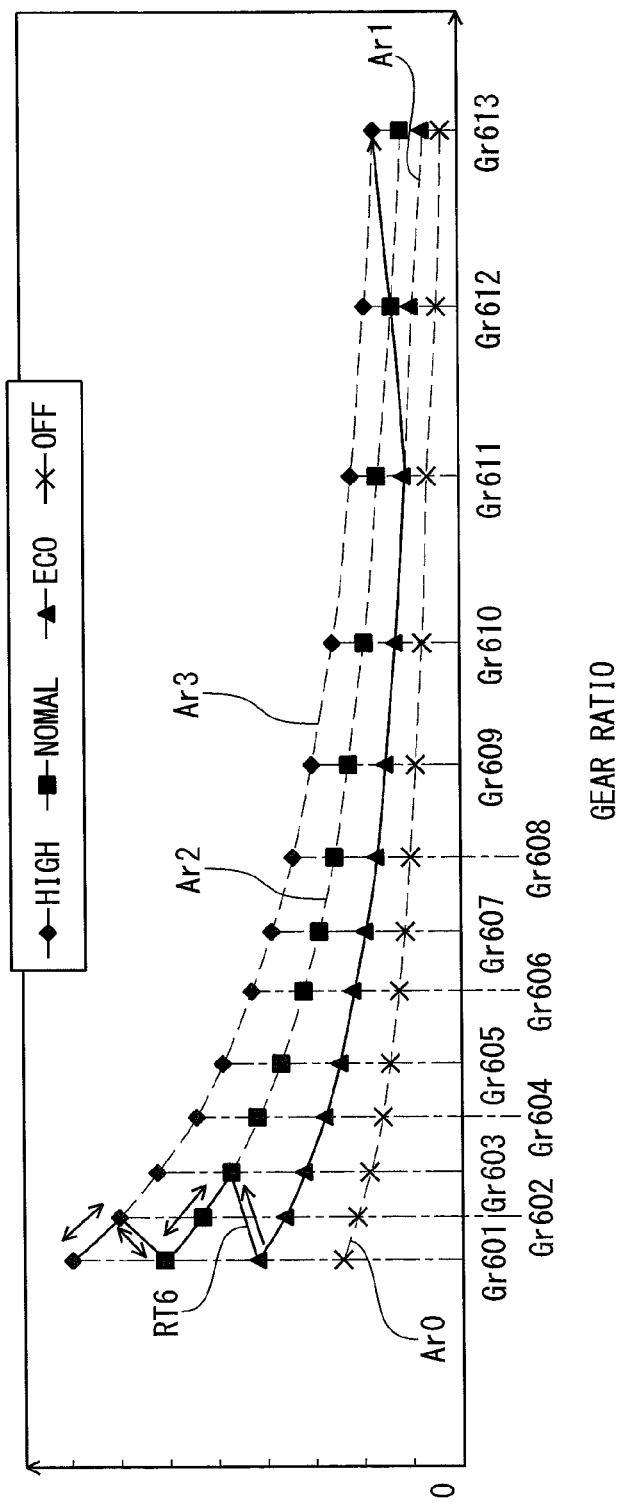
FIG. 22 is a diagram showing a relation between a tangent force of a wheel, gear ratios, and assist ratios in a bicycle equipped with the bicycle transmission system in accordance with the sixth embodiment.

As seen in FIG. 22, the controller 40 has a control route RT6 and controls the gear ratio and the assist ratio in accordance with the control route RT6. The controller 40 stores the control route RT6 in the memory M1. The controller 40 controls the transmission 22 and the assist device 24 based on the first input operation (e.g., the upshifting operation or the downshift operation) and the control route RT6 as well as the first embodiment. Accordingly, the control data of the control route RT6 is not described in detail here for the sake of brevity.

With the bicycle transmission system 600, it is possible to obtain substantially the same advantageous effects as those of the bicycle transmission system 100.

In the present application, the term "comprising" and its derivatives, as used herein, are intended to be open ended terms that specify the presence of the stated features, elements, components, groups, integers, and/or step, but do not exclude the presence of other unstated features, elements, components, groups, integers and/or step. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The term "configured" as used herein to describe a component, section or part of a device includes hardware and/or software that is constructed and/or programmed to carry out the desired function. The desired function can be carried out by hardware, software, or a combination of hardware and software.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle transmission system comprising:
   a first input device configured to receive a first input operation from a user;
   a transmission having a plurality of gear ratios and configured to transmit a pedaling torque to a wheel at a current gear ratio among the plurality of gear ratios;
   an assist device having a plurality of assist ratios and configured to assist a rotation of the wheel at a current assist ratio among the plurality of assist ratios; and
   a controller configured to change the current gear ratio into a first predetermined gear ratio without changing the current assist ratio based on the first input operation in a first condition, the controller being configured to change the current gear ratio into a second predetermined gear ratio and change the current assist ratio into a first predetermined assist ratio based on the first input operation in a second condition different from the first condition.

2. The bicycle transmission system according to claim 1, wherein
   the controller is configured to change the current assist ratio into a second predetermined assist ratio without changing the current gear ratio based on the first input operation in a third condition different from the first condition and the second condition.

3. The bicycle transmission system according to claim 1, wherein
   the controller is configured to set a first predetermined gear ratio as the current gear ratio based on the first input operation in the first condition to change the current gear ratio into the first predetermined gear ratio,
   the controller is configured to set a second predetermined gear ratio as the current gear ratio and set the first predetermined assist ratio as the current assist ratio based on the first input operation in the second condition to respectively change the current gear ratio and the current assist ratio into the second predetermined gear ratio and the first predetermined assist ratio, and
   the controller is configured to control the transmission and the assist device based on the current gear ratio and the current assist ratio that are newly set.

4. The bicycle transmission system according to claim 1, wherein the controller has control data and is configured to change the current gear ratio into the first predetermined gear ratio based on the first input operation and the control data in the first condition, and the controller is configured to change the current gear ratio into the second predetermined gear ratio and change the current assist ratio into the first predetermined assist ratio based on the first input operation and the control data in the second condition.

5. The bicycle transmission system according to claim 4, wherein
the control data comprises combination information that represents predetermined combinations of the plurality of gear ratios and the plurality of assist ratios.

6. The bicycle transmission system according to claim 5, wherein
the control data comprises order information that represents an order of control by the controller concerning the combination information.

7. The bicycle transmission system according to claim 6, further comprising:
a setting device via which the user is to change the order information.

8. The bicycle transmission system according to claim 1, wherein
the first input device is configured to receive both an upshifting operation and a downshifting operation as the first input operation,
the controller is configured to change the current gear ratio into the first predetermined gear ratio without changing the current assist ratio based on one of the upshifting operation and the downshifting operation in the first condition, and
the controller is configured to change the current gear ratio into the second predetermined gear ratio and change the current assist ratio into the first predetermined assist ratio based on one of the upshifting operation and the downshifting operation in the second condition.

9. The bicycle transmission system according to claim 8, wherein
the controller has control data and is configured to change the current gear ratio into the first predetermined gear ratio without changing the current assist ratio based on the control data and one of the upshifting operation and the downshifting operation in the first condition, and
the controller is configured to change the current gear ratio into the second predetermined gear ratio and change the current assist ratio into the first predetermined assist ratio based on the control data and one of the upshifting operation and the downshifting operation in the second condition.

10. The bicycle transmission system according to claim 9, wherein
the control data comprises combination information that represents predetermined combinations of the plurality of gear ratios and the plurality of assist ratios, and
the predetermined combinations selectable based on the upshifting operation are equal to the predetermined combinations selectable based on the downshifting operation.

11. The bicycle transmission system according to claim 9, wherein
the control data comprises combination information that represents predetermined combinations of the plurality of gear ratios and the plurality of assist ratios, and
the predetermined combinations selectable based on the upshifting operation are at least partly different from the predetermined combinations selectable based on the downshifting operation.

12. The bicycle transmission system according to claim 1, wherein
the first condition comprises a condition that the current gear ratio is between a first gear ratio of the plurality of gear ratios and a second gear ratio of the plurality of gear ratios,
the first gear ratio is smaller than a maximum gear ratio of the plurality of gear ratios, and
the second gear ratio is larger than a minimum gear ratio of the plurality of gear ratios.

13. The bicycle transmission system according to claim 1, further comprising:
a second input device configured to receive a second input operation from the user; and
a mode selector via which the user is to select one of a first mode and a second mode, wherein
the controller controls the transmission and the assist device based on the first input operation in the first mode regardless of the second input operation,
the controller controls the transmission based on the first input operation in the second mode regardless of the second input operation, and
the controller controls the assist device based on the second input operation in the second mode regardless of the first input operation.

14. The bicycle transmission system according to claim 1, wherein
the first input device is configured to receive both an upshifting operation and a downshifting operation as the first input operation and output a corresponding command signal to the controller, and
the controller is configured to control the transmission and the assist device based on the command signal.

15. A bicycle transmission system comprising:
a first input device configured to receive a first input operation from a user;
a transmission having a plurality of gear ratios and configured to transmit a pedaling torque to a wheel at a current gear ratio among the plurality of gear ratios;
an assist device having a plurality of assist ratios and configured to assist a rotation of the wheel at a current assist ratio among the plurality of assist ratios; and
a controller configured to change the current gear ratio into a predetermined gear ratio without changing the current assist ratio based on the first input operation in a first condition, the controller configured to change the current assist ratio into a predetermined assist ratio without changing the current gear ratio based on the first input operation in a third condition different from the first condition.

16. The bicycle transmission system according to claim 15, wherein
the first input device is configured to receive both an upshifting operation and a downshifting operation as the first input operation and output a corresponding command signal to the controller, and
the controller is configured to control the transmission and the assist device based on the command signal.

17. A bicycle transmission system comprising:
a first electrical input part configured to receive a first operation from a user;

a transmission having a plurality of gear ratios and configured to transmit a pedaling torque to a wheel at a current gear ratio among the plurality of gear ratios;

an assist device having a plurality of assist ratios and configured to assist a rotation of the wheel at a current assist ratio among the plurality of assist ratios; and a controller operatively connected to the first electrical input part and configured to change the current gear ratio based on the first operation in a first condition, the controller being configured to change the current assist ratio based on the first operation in a second condition different from the first condition.

18. The bicycle transmission system according to claim 17, wherein
the controller is configured to change the current gear ratio and the current assist ratio based on the first operation in the second condition.

19. The bicycle transmission system according to claim 17, wherein
the controller is configured to change the current gear ratio without changing the current assist ratio based on the first operation in the first condition.

20. The bicycle transmission system according to claim 17, further comprising:
a second electrical input part configured to receive a second operation from the user, wherein
the controller is operatively connected to the second electrical input part,
the controller is configured to change the current gear ratio based on the second operation in a fourth condition, and
the controller is configured to change the current assist ratio based on the second operation in a fifth condition.

21. The bicycle transmission system according to claim 20, wherein
the controller is configured to change the current gear ratio and the current assist ratio based on the second operation in the fifth condition.

22. The bicycle transmission system according to claim 20, wherein
the controller is configured to change the current gear ratio without changing the current assist ratio based on the second operation in the fourth condition.

23. The bicycle transmission system according to claim 17, further comprising:
a first input device that includes the first electrical input part, wherein
the first input device is configured to receive both an upshifting operation and a downshifting operation as the first operation from the first electrical input part and output a corresponding command signal to the controller, and
the controller is configured to control the transmission and the assist device based on the command signal.

* * * * *